(12) United States Patent  
Kitayama et al.

(10) Patent No.: US 9,129,569 B2
(45) Date of Patent: Sep. 8, 2015

(54) LIQUID CRYSTAL DISPLAY DEVICE

(75) Inventors: Masae Kitayama, Osaka (JP);
Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 13/581,052

(22) PCT Filed: Feb. 24, 2011

(86) PCT No.: PCT/JP2011/054185
§ 371 (c)(1),
(2), (4) Date: Aug. 24, 2012

(87) PCT Pub. No.: WO2011/105514
PCT Pub. Date: Sep. 1, 2011

(65) Prior Publication Data
US 2012/0327135 A1 Dec. 27, 2012

(30) Foreign Application Priority Data

Feb. 26, 2010 (JP) ................... 2010-042311

(51) Int. Cl.
*G09G 5/10* (2006.01)
*G09G 3/36* (2006.01)
(Continued)

(52) U.S. Cl.
CPC ............ *G09G 3/3607* (2013.01); *G09G 3/3651* (2013.01); *G02F 1/13624* (2013.01); *G02F 2001/134345* (2013.01); *G09G 3/3614* (2013.01); *G09G 2300/0443* (2013.01);
(Continued)

(58) Field of Classification Search
USPC .................................. 345/87–104, 204, 690
See application file for complete search history.

(56) References Cited

U.S. PATENT DOCUMENTS

| 6,724,452 | B1 | 4/2004 | Takeda et al. |
| 6,879,364 | B1 | 4/2005 | Sasaki et al. |
| 6,958,791 | B2 | 10/2005 | Shimoshikiryo |

(Continued)

FOREIGN PATENT DOCUMENTS

| CN | 101004502 A | 7/2007 |
| JP | 11-242225 A | 9/1999 |

(Continued)

OTHER PUBLICATIONS

Official Communication issued in International Patent Application No. PCT/JP2011/054185, mailed on Apr. 5, 2011.

(Continued)

*Primary Examiner* — Charles V Hicks
*Assistant Examiner* — Jeffrey Steinberg
(74) *Attorney, Agent, or Firm* — Keating & Bennett, LLP

(57) ABSTRACT

A liquid crystal display device (100A) according to the present invention includes a plurality of pixels (10) which are arranged in columns and rows to form a matrix pattern. Each of the plurality of pixels (10) includes first and second subpixels (10a, 10b), which are arranged in a column direction, one of which is a bright subpixel that exhibits a higher luminance than the other at least at a particular grayscale, and the other of which is a dark subpixel. The plurality of pixels define a plurality of color display pixels, each of which includes an even number of pixels including first, second, third and fourth pixels (Y, R, G, B) that are arranged in a row direction. In an arbitrary row of pixels, a row of subpixels including the bright subpixels includes the respective bright subpixels of all of the first, second, third and fourth pixels.

13 Claims, 11 Drawing Sheets

(51) Int. Cl.
　　　*G02F 1/1362*　　　(2006.01)
　　　*G02F 1/1343*　　　(2006.01)

(52) U.S. Cl.
　　　CPC .... *G09G2300/0452* (2013.01); *G09G 2310/06* (2013.01); *G09G 2320/028* (2013.01)

(56) References Cited

U.S. PATENT DOCUMENTS

| | | |
|---|---|---|
| 2005/0062904 A1 | 3/2005 | Shimoshikiryo |
| 2005/0206827 A1* | 9/2005 | Tseng ........................... 349/149 |
| 2006/0221030 A1 | 10/2006 | Shih et al. |
| 2007/0126944 A1* | 6/2007 | Kim et al. ....................... 349/43 |
| 2008/0106660 A1 | 5/2008 | Kitayama et al. |
| 2008/0165299 A1 | 7/2008 | Huang et al. |
| 2009/0065778 A1 | 3/2009 | Tsubata et al. |
| 2010/0014012 A1* | 1/2010 | Irie et al. ......................... 349/39 |
| 2010/0033456 A1* | 2/2010 | Yoshida et al. ............... 345/207 |
| 2010/0207969 A1 | 8/2010 | Ueki et al. |
| 2010/0277677 A1 | 11/2010 | Nakamura et al. |
| 2011/0249046 A1* | 10/2011 | Lee et al. ...................... 345/691 |

FOREIGN PATENT DOCUMENTS

| | | |
|---|---|---|
| JP | 2000-155317 A | 6/2000 |
| JP | 2004-62146 A | 2/2004 |
| JP | 2005-99746 A | 4/2005 |
| JP | 2006-285238 A | 10/2006 |
| JP | 4104639 B2 | 6/2008 |
| JP | 2008-164667 A | 7/2008 |
| KR | 10-2008-0103589 A | 11/2008 |
| WO | 2007/148519 A1 | 12/2007 |
| WO | 2009/034714 A1 | 3/2009 |

OTHER PUBLICATIONS

Shimoshikiryoh, "Liquid Crystal Display Device", U.S. Appl. No. 13/581,056, filed Aug. 24, 2012.

English translation of Official Communication issued in corresponding International Application PCT/JP2011/054185, mailed on Sep. 13, 2012.

\* cited by examiner

FIG.3

LIQUID CRYSTAL DISPLAY DEVICE

TECHNICAL FIELD

The present invention relates to a liquid crystal display device and more particularly relates to a liquid crystal display device that has a multi-pixel structure and that conducts a display operation in colors by using four or more kinds of pixels that display mutually different colors.

BACKGROUND ART

An MVA (multi-domain vertical alignment) mode liquid crystal display device has a wider viewing angle characteristic than a TN mode liquid crystal display device, and therefore, is currently used extensively in various liquid crystal display devices including TV monitors (see Patent Documents Nos. 1 and 2, for example).

In an MVA mode liquid crystal display device, a domain control structure (which is also called an "alignment control structure") is provided for each of the two substrates thereof, which face each other with a vertical alignment liquid crystal layer interposed between them, so as to face the liquid crystal layer, thereby producing multiple liquid crystal domains in which directors have multiple different alignment directions (i.e., tilt directions). As such a domain control structure, either an opening (e.g., a slit) that has been cut through an electrode or a dielectric projection (e.g., a rib) that has been formed on an electrode to face the liquid crystal layer is used.

Typically, domain control structures, which run straight in two directions that intersect with each other at right angles, are arranged on each of the two substrates. And the domain control structures provided for one and the other of the two substrates are arranged so as to run alternately and parallel to each other when viewed perpendicularly to the substrates. As a result, when a voltage is applied to the liquid crystal layer of an arbitrary pixel, four domains, in which liquid crystal molecules tilt in four different directions (which will be sometimes referred to herein as "liquid crystal domain director directions"), are produced between those linear domain control means so that the tilt direction of the liquid crystal molecules in any one of those four domains defines an angle of about 90 degrees with respect to that of the liquid crystal molecules in an adjacent domain thereof. In a typical arrangement, four liquid crystal domains, in which the liquid crystal domain directors define an azimuth angle of 45 degrees with respect to the polarization axes (i.e., transmission axes) of two polarizers that are arranged as crossed Nicols, are formed. If an azimuth angle of zero degrees is supposed to be defined by the polarization axis direction of the one of the two polarizers (e.g., the horizontal direction on the display screen) and if the counterclockwise direction is supposed to be the positive direction, then the directors in those four liquid crystal domains will have azimuth angles of 45, 135, 225 and 315 degrees, respectively.

In this description, the "pixel" refers to the smallest unit of display to be conducted by the liquid crystal display device. In the case of a color display device, the "pixel" refers to the smallest unit for representing each of its primary colors, and is sometimes called a "dot". In a typical color display device, one color display pixel is formed by three pixels that represent the colors red, green and blue that are the three primary colors of light. And by controlling the luminances of those pixels, the color display device conducts a display operation in colors.

Thus, to reduce the viewing angle dependence of the γ characteristic of an MVA mode liquid crystal display device, the applicant of the present application lately disclosed, in Patent Document No. 3, a liquid crystal display device that can reduce the viewing angle dependence of the γ characteristic by dividing a single pixel into a number of subpixels with mutually different brightness values, and a method for driving such a device. In particular, such a device can reduce the viewing angle dependence of the γ characteristic that manifests itself as a phenomenon that the display luminances at low grayscales become higher than a predetermined luminance (i.e., the image on the screen looks generally whitish) in a normally black mode display operation. Such a display or drive mode will sometimes be referred to herein as "area-grayscale display", "area-grayscale drive", "multi-pixel display" or "multi-pixel drive".

Recently, a method in which an increased number of primary colors are used to conduct a display operation in order to broaden the range in which a liquid crystal display device can represent colors (which is called a "color reproduction range") has been proposed. For example, a liquid crystal display device with color display pixels, each of which includes not only red (R), green (G) and blue (B) pixels but also a pixel in at least one more color (e.g., a yellow (Y), cyan (C), magenta (M) or white (W) pixel), has been disclosed. When a white pixel is added, the color reproduction range cannot be broadened but the display luminance can be increased.

The entire disclosures of Patent Documents Nos. 1 to 3 are hereby incorporated by reference.

CITATION LIST

Patent Literature

Patent Document No. 1: Japanese Laid-Open Patent Publication No. 11-242225 (corresponding to U.S. Pat. No. 6,724,452)

Patent Document No. 2: Japanese Laid-Open Patent Publication No. 2000-155317 (corresponding to U.S. Pat. No. 6,879,364)

Patent Document No. 3: Japanese Laid-Open Patent Publication No. 2004-62146 (corresponding to U.S. Pat. No. 6,958,791)

SUMMARY OF INVENTION

Technical Problem

However, the present inventors discovered via experiments that when the multi-pixel drive disclosed in Patent Document No. 3 was carried out on a four-primary-color display device with a striped arrangement, parallel lines that were displayed in the row direction looked smeared. This is a problem.

According to the multi-pixel driving method disclosed in Patent Document No. 3, by applying mutually different storage capacitor counter voltages (which will be sometimes referred to herein as "CS signal voltages") to two electrically independent storage capacitors that are provided for two subpixels, mutually different effective voltages can be applied to the respective liquid crystal layers of the two subpixels as will be described later with reference to FIGS. 7 to 10. Specifically, after a predetermined display signal voltage has been applied to two subpixel electrodes, their TFTs turn OFF, thereby electrically disconnecting the subpixel electrodes from their source bus line. After that, the storage capacitor counter voltages are changed in two different patterns (in terms of the magnitude, the direction and the sign of the variation) with respect to the two subpixels, thereby making the effective voltages applied to the respective liquid crystal layers of the two subpixels different from each other.

According to that multi-pixel driving method, the combination of the polarity of the display signal voltage and the direction of the variation in storage capacitor counter voltage determines which of the two effective voltages applied to the respective liquid crystal layers of the two subpixels becomes higher than the other. That is why if a one dot inversion drive operation is carried out on a liquid crystal display device with a multi-pixel structure, in which bright and dark subpixels are arranged in the column direction, to avoid flicker, then bright subpixels will be arranged in a zigzag pattern in the row direction in accordance with the arrangement of polarities of the display signal voltages applied to the respective liquid crystal layers of the pixels. Specifically, in an ordinary liquid crystal display device that uses the three primary colors of R, G and B, the pixels that form two color display pixels that are adjacent to each other in the row direction are arranged as R (+), G (−), B (+), R (−), G (+) and B (−). And in accordance with these polarities, the respective positions of the bright subpixels in the column direction become R (top), G (bottom), B (top), R (bottom), G (top) and B (bottom). Consequently, in the two pixels, the respective bright subpixels of R, G and B are arranged in their upper halves and the respective bright subpixels of G, R and B are arranged in their lower halves. And bright subpixels in the three primary colors will be present on each row of subpixels.

However, if a liquid crystal display device that uses the four primary colors of Y, R, G and B is subjected to a multi-pixel drive, the pixels that form two color display pixels that are adjacent to each other in the row direction are arranged as Y (+), R (−), G (+), B (−), Y (+), R (−), G (+) and B (−) as shown in FIG. 9. And in accordance with these polarities, the respective positions of the bright subpixels in the column direction become Y (top), R (bottom), G (top), B (bottom), Y (top), R (bottom), G (top) and B (bottom). Consequently, in the two pixels, two Y bright subpixels and two G bright subpixels are arranged in their upper halves and two R bright subpixels and two B bright subpixels are arranged in their lower halves. In that case, when lines in a halftone achromatic color (i.e., in grey) are displayed parallel to each other in the row direction, the upper edges will look colored due to the influence of the Y and G bright subpixels, and the lower edges will look colored due to the influence of the R and B bright subpixels. The same problem arises even when a white pixel is added.

This is a problem with not only such a device that uses four primary colors but also any other liquid crystal display device with a striped arrangement that uses an even number of primary color pixels in the row direction.

The present inventors perfected our invention in order to overcome these problems by providing a liquid crystal display device with color display pixels, each comprised of four or a larger even number of primary color pixels, which does not cause the color smearing problem even when subjected to such a multi-pixel drive.

Solution to Problem

A liquid crystal display device according to the present invention includes a plurality of pixels which are arranged in columns and rows to form a matrix pattern. Each of the plurality of pixels includes first and second subpixels, which are arranged in a column direction, one of which is a bright subpixel that exhibits a higher luminance than the other at least at a particular grayscale, and the other of which is a dark subpixel. The plurality of pixels define a plurality of color display pixels, each of which includes an even number of pixels including first, second, third and fourth pixels that are arranged in a row direction. In an arbitrary row of pixels, a row of subpixels including the bright subpixels includes the respective bright subpixels of all of the first, second, third and fourth pixels.

In one embodiment, taking an arbitrary row of pixels, the arrangement in the column direction of the bright and dark subpixels in one of two arbitrary adjacent color display pixels is opposite to their arrangement in the other color display pixel.

In one embodiment, the liquid crystal display device includes: a plurality of source bus lines, each of which is associated with one of the columns of pixels; a plurality of gate bus lines, each of which is associated with one of the rows of pixels; a plurality of TFTs, each of which is associated with the first or second subpixel of one of the plurality of pixels; a plurality of first CS bus lines, each of which is associated with the first subpixel of a particular one of the pixels; and a plurality of second CS bus lines, each of which is associated with the second subpixel of a particular one of the pixels. The first subpixel includes: a liquid crystal capacitor that is formed by a first subpixel electrode, a liquid crystal layer, and a counter electrode that faces the first subpixel electrode with the liquid crystal layer interposed; and a first storage capacitor that is formed by a first storage capacitor electrode that is electrically connected to the first subpixel electrode, an insulating layer, and a first storage capacitor counter electrode that faces the first storage capacitor electrode with the insulating layer interposed. The second subpixel includes: a liquid crystal capacitor that is formed by a second subpixel electrode, the liquid crystal layer, and the counter electrode that faces the second subpixel electrode with the liquid crystal layer interposed; and a second storage capacitor that is formed by a second storage capacitor electrode that is electrically connected to the second subpixel electrode, the insulating layer, and a second storage capacitor counter electrode that faces the second storage capacitor electrode with the insulating layer interposed. When the TFTs associated with the first and second subpixels are in ON state, display signal voltages are supplied to the first and second subpixel electrodes and the first and second storage capacitor counter electrodes through their associated source bus lines. After the TFTs have been turned OFF, the voltages applied to the first and second storage capacitor counter electrodes vary, and the first and second subpixels cause mutually different variations, each of which is defined by the direction and magnitude of that variation. In an arbitrary one of the color display pixels, the display signal voltages applied to two adjacent pixels have mutually opposite polarities. In an arbitrary row of pixels, the respective polarities of the display signal voltages applied to the first, second, third and fourth pixels in one of two arbitrary adjacent color display pixels are opposite to those of the display signal voltages applied to their counterparts in the other color display pixel.

In one embodiment, taking an arbitrary row of pixels, the arrangement in the column direction of the bright and dark subpixels in one of two arbitrary adjacent color display pixels is the same as their arrangement in the other color display pixel.

In one embodiment, the liquid crystal display device includes: a plurality of source bus, lines, each of which is associated with one of the columns of pixels; a plurality of gate bus lines, each of which is associated with one of the rows of pixels; a plurality of TFTs, each of which is associated with the first or second subpixel of one of the plurality of pixels; and a plurality of first CS bus lines, each of which is associated with the first subpixel of a particular one of the pixels. The first subpixel includes: a liquid crystal capacitor that is formed by a first subpixel electrode, a liquid crystal layer, and a counter electrode that faces the first subpixel electrode with the liquid crystal layer interposed; and a first storage capacitor that is formed by a first storage capacitor electrode that is electrically connected to the first subpixel electrode, an insulating layer, and a first storage capacitor counter electrode that faces the first storage capacitor electrode with the insulating layer interposed. The second subpixel includes a liquid crystal capacitor that is formed by a second subpixel electrode, and the counter electrode that faces the second subpixel electrode with the liquid crystal layer interposed. A first CS signal voltage applied to the first storage capacitor counter electrode through an associated one of the first CS bus lines is an oscillation voltage, of which one period is shorter than one vertical scanning period, and has at least three potentials including first and second potentials that define the maximum amplitude and a third potential between the first and second potentials. When a gate signal voltage to be supplied to one of the gate bus lines that is associated with an arbitrary one of the rows of pixels changes from high level into low level, the first CS signal voltage supplied to the associated first CS bus line is at the third potential.

In one embodiment, the third potential is the average of the first and second potentials.

In one embodiment, the liquid crystal display device further includes a plurality of second CS bus lines, each of which is associated with the second subpixel of a particular one of the pixels. The second subpixel includes a second storage capacitor which is formed by a second storage capacitor electrode that is electrically connected to the second subpixel electrode, the insulating layer, and a second storage capacitor counter electrode that faces the second storage capacitor electrode with the insulating layer interposed. A second CS signal voltage to be applied to the second storage capacitor counter electrode through an associated one of the second CS bus lines is constant through one vertical scanning period.

In one embodiment, the second CS signal voltage is equal to a counter voltage applied to the counter electrode.

In one embodiment, the second subpixel has no storage capacitors.

In one embodiment, the first, second, third and fourth pixels include one of yellow, cyan, magenta and white pixels and all of red, green and blue pixels.

Advantageous Effects of Invention

The present invention provides a liquid crystal display device with color display pixels, each comprised of four or a larger even number of primary color pixels, which does not cause the color smearing problem even when subjected to such a multi-pixel drive.

BRIEF DESCRIPTION OF DRAWINGS

FIG. 3 A diagram schematically illustrating the display state of the liquid crystal display device 100A of the first embodiment being driven by a one-dot inversion drive method.

DESCRIPTION OF EMBODIMENTS

Hereinafter, embodiments of a liquid crystal display device according to the present invention will be described with reference to the accompanying drawings. However, the present invention is in no way limited to the specific embodiments to be described below.

Figure 1:
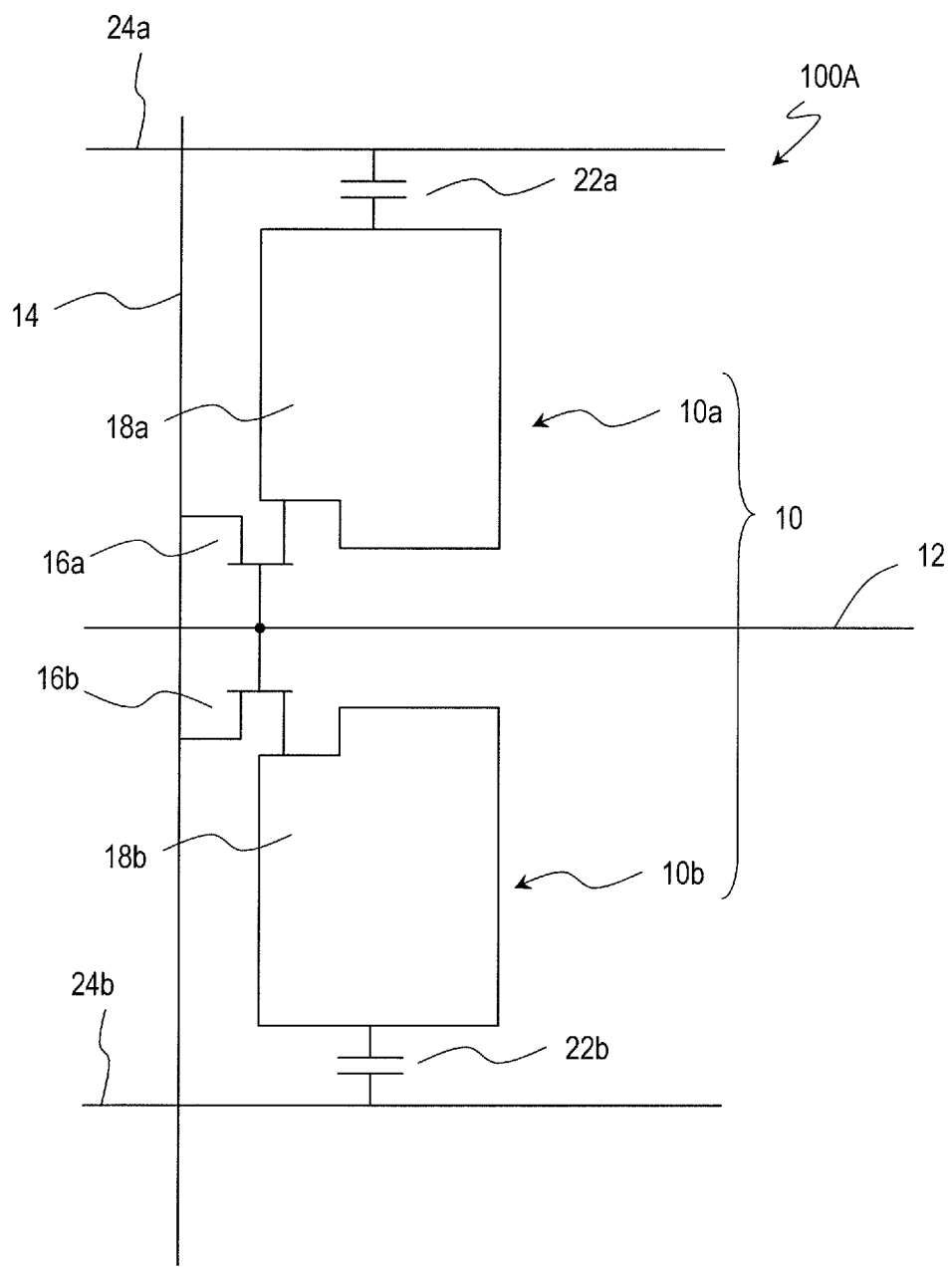
FIG. 1 A schematic representation illustrating an exemplary pixel structure for a liquid crystal display device 100A as an embodiment of the present invention.

FIG. 1 schematically shows an electrical configuration for a liquid crystal display device 100A as an embodiment of the present invention. The liquid crystal display device 100A has a plurality of pixels that are arranged in columns and rows to form a matrix pattern. And FIG. 1 illustrates the structure of one of those pixels.

The pixel 10 is divided into two subpixels 10a and 10b. To these subpixels 10a and 10b, connected are their associated TFTs 16a and 16b and their associated storage capacitors (CS) 22a and 22b, respectively. The gate electrodes of the TFTs 16a and 16b are both connected to the same gate bus line (scan line) 12. And their source electrodes are connected to the same source bus line (signal line) 14. The storage capacitors 22a and 22b are connected to their associated CS bus lines (storage capacitor lines) 24a and 24b, respectively. The storage capacitor 22a includes a storage capacitor electrode that is electrically connected to the subpixel electrode 18a, a storage capacitor counter electrode that is electrically connected to the CS bus line 24a, and an insulating layer (not shown) arranged between the electrodes. The storage capacitor 22b includes a storage capacitor electrode that is electrically connected to the subpixel electrode 18b, a storage capacitor counter electrode that is electrically connected to the CS bus line 24b, and an insulating layer (not shown) arranged between the electrodes. The respective storage capacitor counter electrodes of the storage capacitors 22a and 22b are independent of each other and have such a structure as receiving mutually different storage capacitor counter voltages (CS signals voltages) from the CS bus lines 24a and 24b, respectively.

Figure 2:
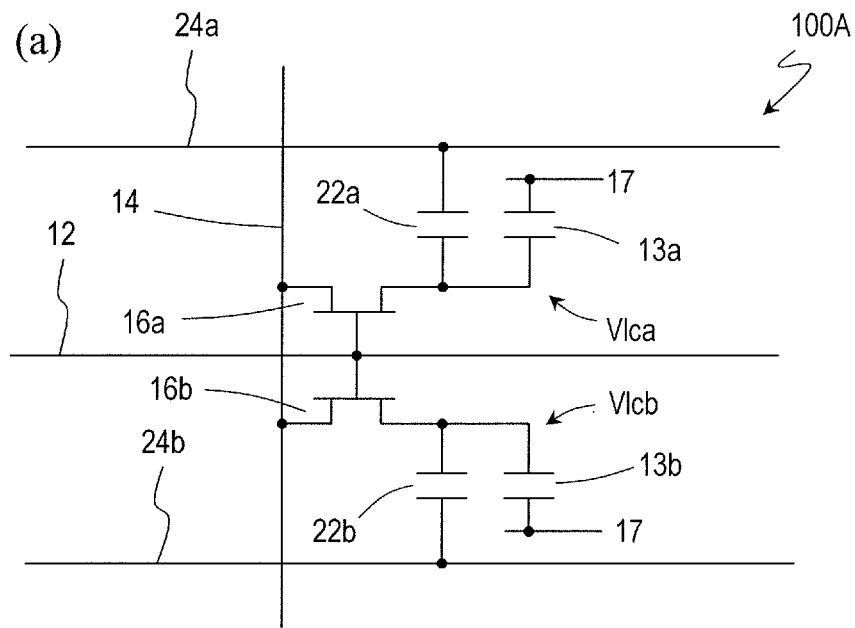
FIG. 2 (a) is a diagram illustrating an electrical equivalent circuit corresponding to the pixel structure of the liquid crystal display device 100A and (b) is a diagram illustrating an electrical equivalent circuit corresponding to the pixel structure of a liquid crystal display device 100B as another embodiment of the present invention.
Figure 2:
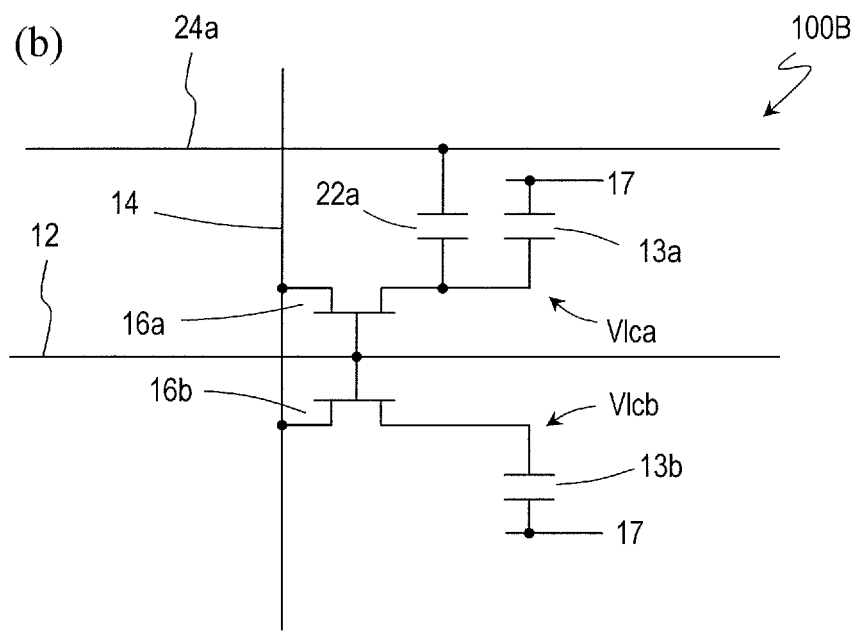

FIG. 2(a) schematically shows the equivalent circuit of one pixel of the liquid crystal display device 100A. In this electrical equivalent circuit, the liquid crystal capacitors of the respective subpixels 10a and 10b are identified by the reference numerals 13a and 13b, respectively. Each of these liquid crystal capacitors 13a and 13b includes a subpixel electrode 18a, 18b, a liquid crystal layer, and a counter electrode 17 (that is shared by the subpixel electrodes 10a and 10b). In the following description, when described as electrical components, the liquid crystal capacitors 13a and 13b will also be referred to herein as "liquid crystal capacitors Clca and Clcb".

In the subpixel 10a, one electrode of the liquid crystal capacitor Clca and one electrode of the storage capacitor Ccsa are connected to the drain electrode of the TFT 16a, which is provided to drive the subpixel 10a. The other electrode of the liquid crystal capacitor Clca is connected to the counter electrode. And the other electrode of the storage capacitor Ccsa is connected to the CS bus line 24a. In the subpixel 10b, one electrode of the liquid crystal capacitor Clcb and one electrode of the storage capacitor Ccsb are connected to the drain electrode of the TFT 16b, which is provided to drive the subpixel 10b. The other electrode of the liquid crystal capacitor Clcb is connected to the counter electrode. And the other electrode of the storage capacitor Ccsb is connected to the CS bus line 24b. The gate electrodes of the TFTs 16a and 16b are both connected to the gate bus line 12 and their source electrodes are both connected to the source bus line 14. As long as the same gate signal voltage and the same display signal voltage (source signal voltage) are applied to the TFTs 16a and 16b, the TFTs 16a and 16b do not always have to share the same gate bus line 12 and/or the same source bus line 14.

Patent Document No. 3 also discloses the same pixel structure as that of this liquid crystal display device 100A. To overcome the problem with the multi-pixel drive as disclosed in Patent Document No. 3, a liquid crystal display device 100A according to the first embodiment of the present invention adopts a different distribution of polarities of the display signal voltages applied to color display pixels that are adjacent to each other in the row direction from that of the liquid crystal display device disclosed in Patent Document No. 3 (see FIG. 3). According to the first embodiment, both of the storage capacitor counter voltages (CS signal voltages) supplied to the CS bus lines 24a and 24b are oscillation voltages as in the liquid crystal display device disclosed in Patent Document No. 3. In this description, the "oscillation voltage" will refer herein to a voltage, of which one oscillation period is shorter than one vertical scanning period, unless otherwise stated.

On the other hand, the liquid crystal display device 100A as a second embodiment of the present invention is configured to apply, in combination, a display signal voltage that is supplied from an associated source bus line 14 and a storage capacitor counter voltage (first CS signal voltage) that is supplied as an oscillation voltage from the CS bus line 24a to the liquid crystal layer of one subpixel (which is a bright subpixel that is supposed to be the subpixel 10a in the following description), and to apply a display signal voltage to the liquid crystal layer of the other subpixel (i.e., subpixel 10b) without applying any oscillation voltage thereto. That is to say, substantially only the display signal voltage is applied to the liquid crystal layer of the other subpixel (i.e., the subpixel 10b). That is why the storage capacitor counter voltage (second CS signal voltage) Vcsb applied to the subpixel 10b of the liquid crystal display device 100A of the second embodiment is not an oscillation voltage but a DC voltage (see Vcsb shown in FIG. 4). In this description, the "DC voltage" refers herein to a voltage that remains direct current (i.e., has a constant potential) through one vertical scanning period. The DC voltage applied as Vcsb had better be equal to the counter voltage to be applied to the counter electrode. It should be noted that the magnitude of a voltage applied to the liquid crystal layer is represented by reference to the potential at the counter electrode.

In addition, in the liquid crystal display device as a second embodiment of the present invention, there is no need to apply an oscillation voltage to the liquid crystal layer of the subpixel 10b, and therefore, a configuration in which the subpixel 10b to be a dark subpixel has no storage capacitor as in the liquid crystal display device 100B shown in FIG. 2(b) may also be adopted. By omitting the storage capacitor in this manner, the aperture ratio of each pixel can be increased. In known 2× and 4× liquid crystal display devices, one vertical scanning period is 1/60 seconds (i.e., its vertical scanning frequency is 60 Hz). On the other hand, in liquid crystal display devices, of which one vertical scanning period is 1/120 or 1/240 seconds, the voltage applied to the liquid crystal layer needs to be retained for just a short time, and therefore, the storage capacitor can be omitted.

Figure 4:
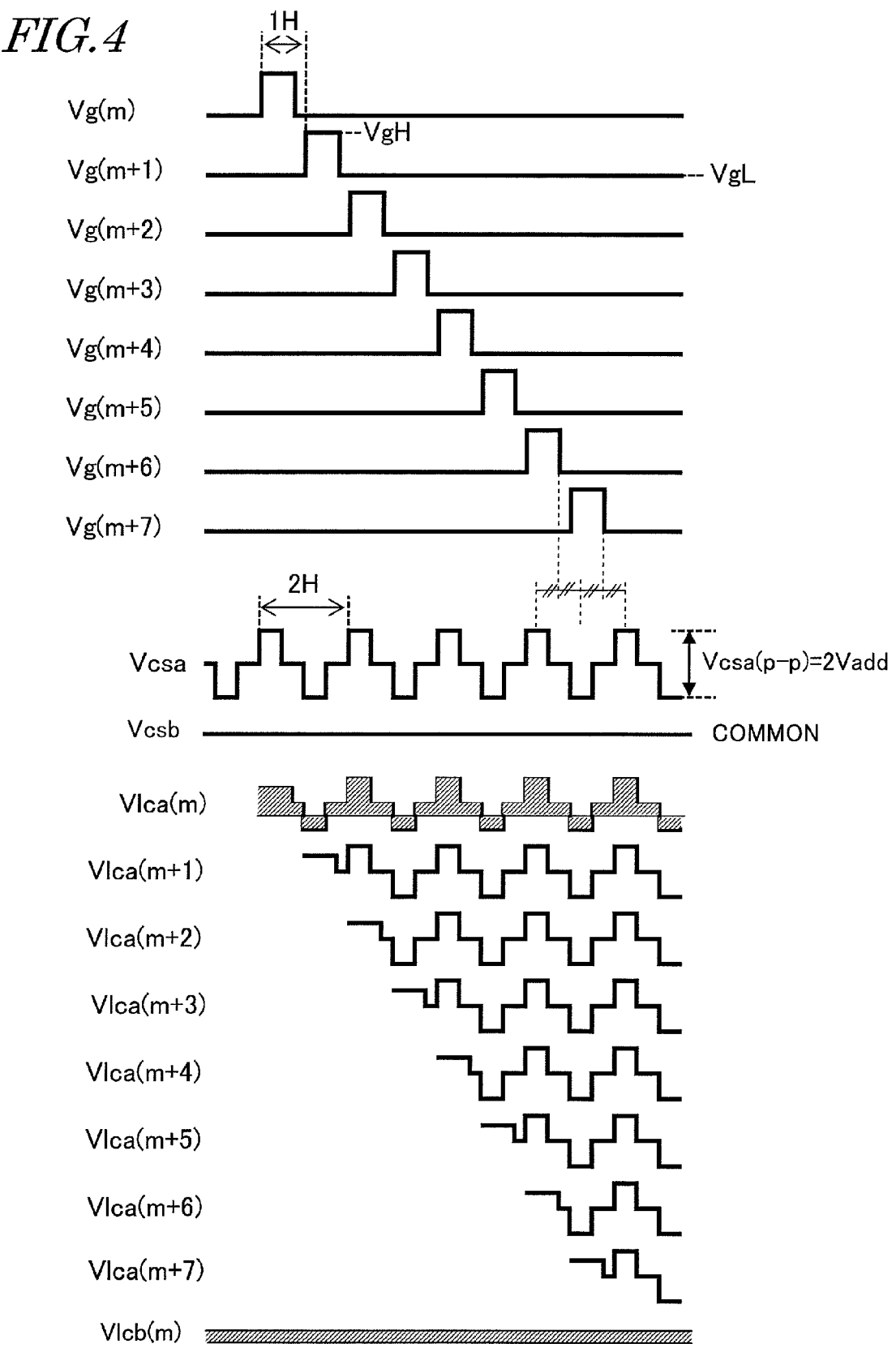
FIG. 4 A diagram illustrating the respective waveforms of various voltages (signals) to drive the liquid crystal display device 100A as a second embodiment of the present invention.

In the liquid crystal display device 100A, 100B according to the second embodiment of the present invention, the CS signal voltage Vcsa applied to the storage capacitor counter electrode of the subpixel 10a through the CS bus line 24a is an oscillation voltage, of which one period is shorter than one vertical scanning period, and has at least three potentials including first and second potentials that define a maximum amplitude and a third potential between the first and second potentials as shown in FIG. 4. It would be beneficial that the third potential is the average of the first and second potentials as illustrated in FIG. 4. As also shown in FIG. 4, the first, second and third potentials are suitably maintained for a certain period. Furthermore, when the gate signal voltage that is supplied to a gate bus line and that has been high goes low (i.e., when the TFT turns OFF), the CS signal voltage supplied to the associated CS bus line is set to be the third potential. As a result, the liquid crystal display device 100A, 100B according to the second embodiment of the present invention can overcome the problem with the multi-pixel drive of Patent Document No. 3 while reducing the viewing angle dependence of the γ characteristic.

It should be noted that "one vertical scanning period" refers herein to a period between a point in time when one gate bus line (or scan line) is selected and a point in time when that gate bus line is selected next time. In a known liquid crystal display device that is not driven by 2× or 4× driving method, one vertical scanning period corresponds to one frame period of a video signal if the video signal is a non-interlaced drive signal but corresponds to one field period of a video signal if the video signal is an interlaced drive signal. For example, in the case of an NTSC signal, one vertical scanning period of the liquid crystal display device is 16.7 msec, which is the inverse number of the field frequency (60 Hz) of the NTSC signal. Since the liquid crystal display device is not supposed to be interlaced driven, signal voltages are written on every pixel in both of odd- and even-numbered fields. That is why the inverse number of the field frequency of the NTSC signal becomes one vertical scanning period. It should be noted that in one vertical scanning period, the interval between a point in time when one gate bus line is selected and a point in time when the next gate bus line is selected is called "one horizontal scanning period (1H)".

Hereinafter, it will be described with reference to FIGS. 7 through 10 what is a problem with the multi-pixel driving method disclosed in Patent Document No. 3. The liquid crystal display device 100A as an embodiment of the present invention not only has the same pixel structure, but also operates on the same principle, as its counterpart disclosed in Patent Document No. 3. That is to say, the liquid crystal display device 100A also makes a bright subpixel by supplying a storage capacitor voltage as an oscillation voltage. That is why the principle of the multi-pixel driving method disclosed in Patent Document No. 3 will also be described. In the following description, a liquid crystal display device that has the same configuration as what is shown in FIGS. 1 and 2(a) and that is supposed to be driven with the voltages shown in portions (a) through (f) of FIG. 7 will be described as an example.

Figure 7:
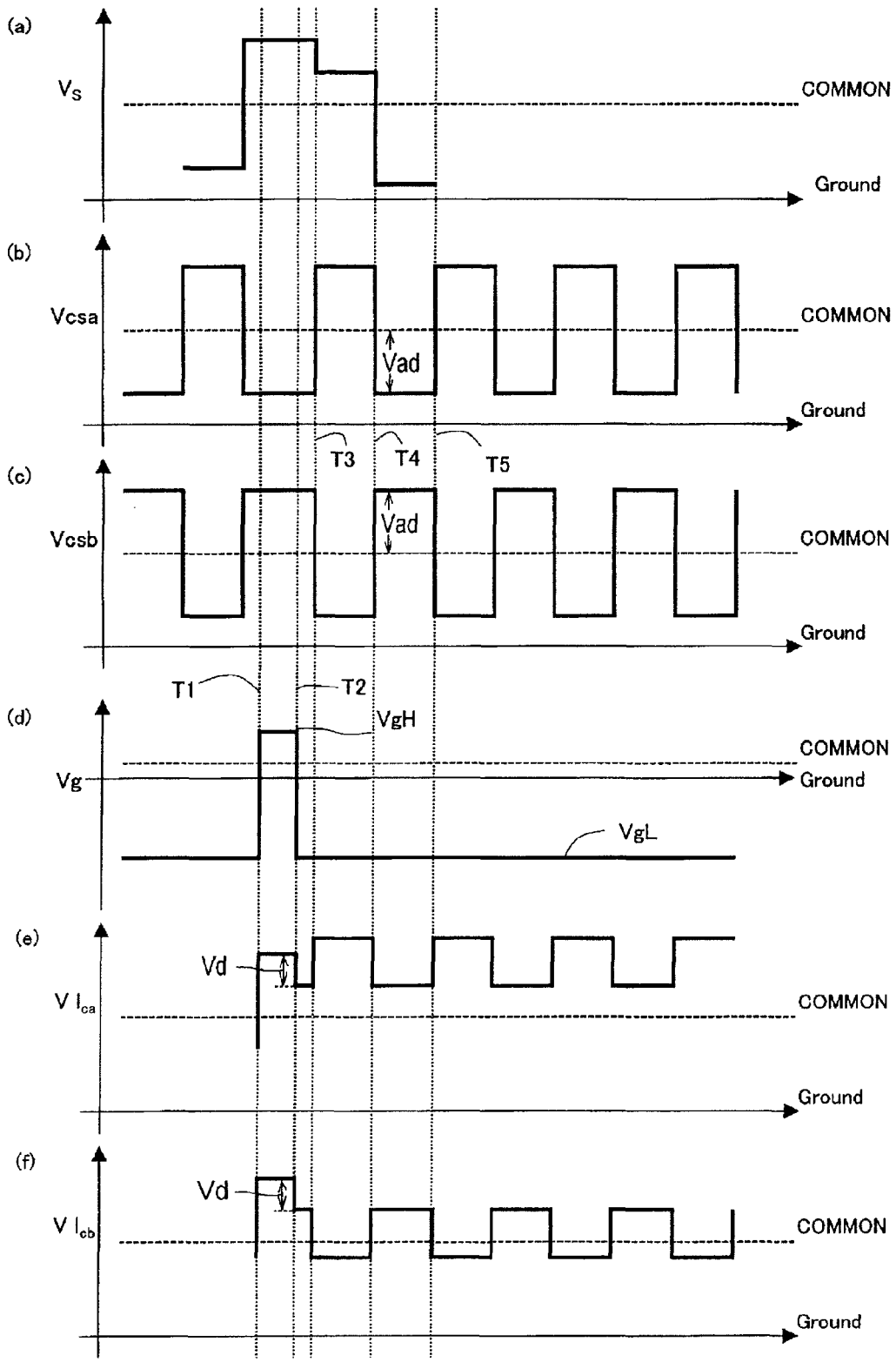
FIG. 7 (a) through (f) show the respective waveforms of various voltages to drive the liquid crystal display device of Patent Document No. 3.

Portions (a) through (f) of FIG. 7 schematically show the timings to apply respective voltages to drive a liquid crystal display device that has the same pixel structure as the liquid crystal display device 100A. Specifically, portion (a) of FIG. 7 shows the voltage waveform Vs of the source bus line 14; portion (b) of FIG. 7 shows the voltage waveform Vcsa of the CS bus line 24a; portion (c) of FIG. 7 shows the voltage waveform Vcsb of the CS bus line 24b; portion (d) of FIG. 7 shows the voltage waveform Vg of the gate bus line 12; portion (e) of FIG. 7 shows the voltage waveform Vlca of the pixel electrode 18a of the subpixel 10a; and portion (f) of FIG. 7 shows the voltage waveform Vlcb of the pixel electrode 18b of the subpixel 10b. In FIG. 7, the dashed line indicates the voltage waveform COMMON (Vcom) of the counter electrode 17.

In the following description, the liquid crystal capacitors Clca and Clcb of the subpixels 10a and 10b are supposed to have the same electrostatic capacitance CLC (V) for the sake of simplicity. The value of CLC (V) depends on the effective voltages (V) applied to the liquid crystal layers of the respective subpixels 10a and 10b. Also, the storage capacitors 22a and 22b that are connected independently of each other to the liquid crystal capacitors of the respective subpixels 10a and 10b are identified by Ccsa and Ccsb, respectively, and supposed to have the same electrostatic capacitance CCS.

First, at a time T1, the gate signal voltage Vg rises from VgL (low) to VgH (high) to turn the TFTs 16a and 16b ON simultaneously. As a result, the display signal voltage Vs on the source bus line 14 is applied to the subpixel electrodes 18a and 18b of the subpixels 10a and 10b to charge the liquid crystal capacitors Clca and Clcb. In the same way, the storage capacitors Ccsa and Ccsb of the respective subpixels are also charged with the display signal voltage Vs on the source bus line 14.

Next, at a time T2, the voltage Vg on the gate bus line 12 falls from VgH to VgL to turn the TFTs 16a and 16b OFF simultaneously and electrically isolate all of the liquid crystal capacitors Clca and Clcb and the storage capacitors Csa and Csb from the source bus line 14. It should be noted that immediately after that, due to the feedthrough phenomenon caused by a parasitic capacitance of the TFTs 16a and 16b and other factors, the voltages Vlca and Vlcb applied to the respective subpixel electrodes decrease by approximately the same voltage Vd to:

$$Vlca=Vs-Vd$$

$$Vlcb=Vs-Vd$$

respectively. Also, in this case, the voltages Vcsa and Vcsb on the CS bus lines are:

$$Vcsa=Vcom-Vad$$

$$Vcsb=Vcom+Vad$$

respectively.

Next, at a time T3, the voltage Vcsa on the CS bus line 24a connected to the storage capacitor Csa rises from Vcom−Vad to Vcom+Vad and the voltage Vcsb on the CS bus line 24b connected to the storage capacitor Csb falls from Vcom+Vad to Vcom−Vad. That is to say, these voltages Vcsa and Vcsb both change twice as much as Vad. As the voltages on the CS bus lines 24a and 24b change in this manner, the voltages Vlca and Vlcb applied to the respective subpixel electrodes change into:

$$Vlca=Vs-Vd+2\times K\times Vad$$

$$Vlcb=Vs-Vd-2\times K\times Vad$$

respectively, where K=CCS/(CLC(V)+CCS)

Next, at a time T4, Vcsa falls from Vcom+Vad to Vcom−Vad and Vcsb rises from Vcom−Vad to Vcom+Vad. That is to say, these voltages Vcsa and Vcsb both change twice as much as Vad again. In this case, Vlca and Vlcb also change from $$Vlca=Vs-Vd+2\times K\times Vad$$

$$Vlcb=Vs-Vd-2\times K\times Vad$$

into $$Vlca=Vs-Vd$$

$$Vlcb=Vs-Vd$$

respectively.

Next, at a time T5, Vcsa rises from Vcom−Vad to Vcom+Vad and Vcsb falls from Vcom+Vad to Vcom−Vad. That is to say, these voltages Vcsa and Vcsb both change twice as much as Vad again. In this case, Vlca and Vlcb also change from $$Vlca=Vs-Vd$$

$$Vlcb=Vs-Vd$$

into $$Vlca=Vs-Vd+2\times K\times Vad$$

$$Vlcb=Vs-Vd-2\times K\times Vad$$

respectively.

After that, every time a period of time that is an integral number of times as long as one horizontal write period (or one horizontal scanning period) 1H has passed, the voltages Vcsa, Vcsb, Vlca and Vlcb alternate their levels at the times T4 and T5. The alternation interval between T4 and T5 may be appropriately determined to be one, two, three or more times as long as 1H according to the driving method of the liquid crystal display device (such as the polarity inversion method) or the display state (such as the degree of flicker or non-smoothness of the image displayed). This alternation is continued until the pixel 10 is rewritten next time, i.e., until the current time becomes equivalent to T1. Consequently, the effective values of the voltages Vlca and Vlcb applied to the subpixel electrodes become:

$$Vlca=Vs-Vd+K\times Vad$$

$$Vlcb=Vs-Vd-K\times Vad$$

respectively.

Therefore, the effective voltages V1 and V2 applied to the respective liquid crystal layers of the subpixels 10a and 10b become:

$$V1=Vlca-Vcom$$

$$V2=Vlcb-Vcom$$

That is to say, $$V1 = Vs - Vd + K \times Vad - Vcom$$

$$V2 = Vs - Vd - K \times Vad - Vcom$$

respectively.

As a result, the difference ΔV12 (=V1−V2) between the effective voltages applied to the respective liquid crystal layers of the subpixels 10a and 10b becomes ΔV12=2×Kc×Vad (where K=CCS/(CLC(V)+CCS)). Thus, mutually different voltages can be applied to the liquid crystal layers.

Figure 8:
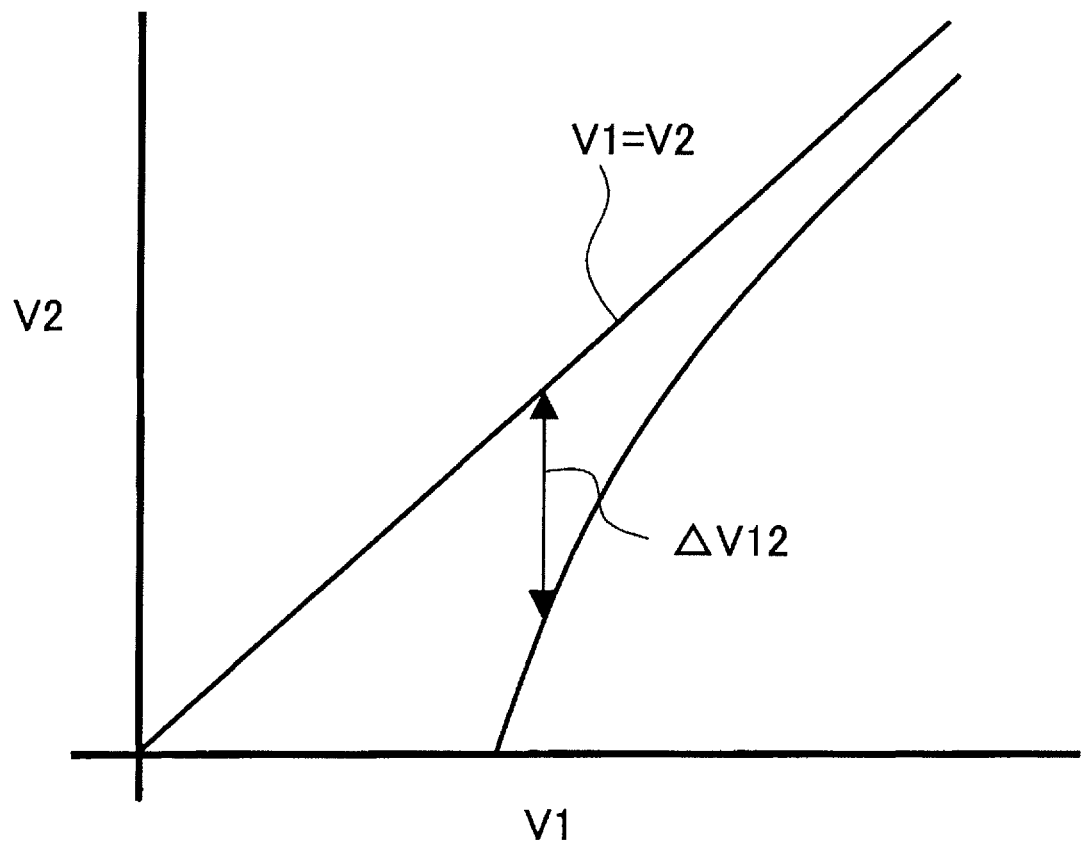
FIG. 8 A graph showing the relation between the voltages applied to the respective liquid crystal layers of two subpixels in the liquid crystal display device of Patent Document No. 3.

FIG. 8 schematically shows the relation between V1 and V2. As can be seen from FIG. 8, the smaller the V1 value, the bigger Δ V12 in the liquid crystal display device 100A. Consequently, the γ characteristic at low grayscales (i.e., grayscales that are closer to black rather than to white) can be improved highly effectively.

Generally speaking, in a liquid crystal display device, the voltage applied to the liquid crystal layer of a pixel is set to be an AC voltage (such a method is sometimes called an "AC driving method") to cope with a reliability problem. That is to say, the applied voltage is defined so that a pixel electrode and a counter electrode invert their potential levels at regular time intervals and that the electric field applied to the liquid crystal layer inverts its direction (i.e., the direction of electric lines of force) at regular time intervals. In a typical liquid crystal display device in which the counter electrode and pixel electrodes are arranged on two different substrates, the electric field applied to the liquid crystal layer inverts its direction from toward the light source to toward the viewer, and vice versa.

The interval at which the electric field applied to the liquid crystal layer inverts its direction is typically twice as long as one vertical scanning period. That is to say, in a liquid crystal display device, every time a picture is presented, the electric field applied to the liquid crystal layer inverts its direction. For that reason, in presenting a still picture, unless the electric field intensities (or applied voltages) exactly match with each other between the two electric field directions (i.e., if the electric field changes its intensity every time it changes its direction), the luminance of each pixel will change with such a variation in electric field intensity, thus producing a flicker on the screen.

In other words, to minimize such a flicker, the electric field intensities (or applied voltages) in those two electric field directions need to exactly match with each other. In liquid crystal display devices to be mass-produced on an industrial basis, however, it is difficult to exactly match the electric field intensities in those two directions. That is why they try to minimize the flicker by arranging pixels that have mutually opposite electric field directions adjacent to each other within a display area because the luminances of the pixels would be spatially averaged in that case. Such a method is generally called either a "dot inversion drive" or a "line inversion drive". It should be noted that these "inversion drive" methods include not just the "one dot inversion" in which the polarities are inverted on a pixel-by-pixel basis in a "checkerboard pattern" so to speak (i.e., every row AND every column) and the "one line inversion" in which the polarities are inverted on a line-by-line basis but also a "two-row, one-column dot inversion" in which the polarities are inverted every other row and every column, and various other patterns. Thus, any of those various methods is appropriately adopted as needed.

Figure 9:
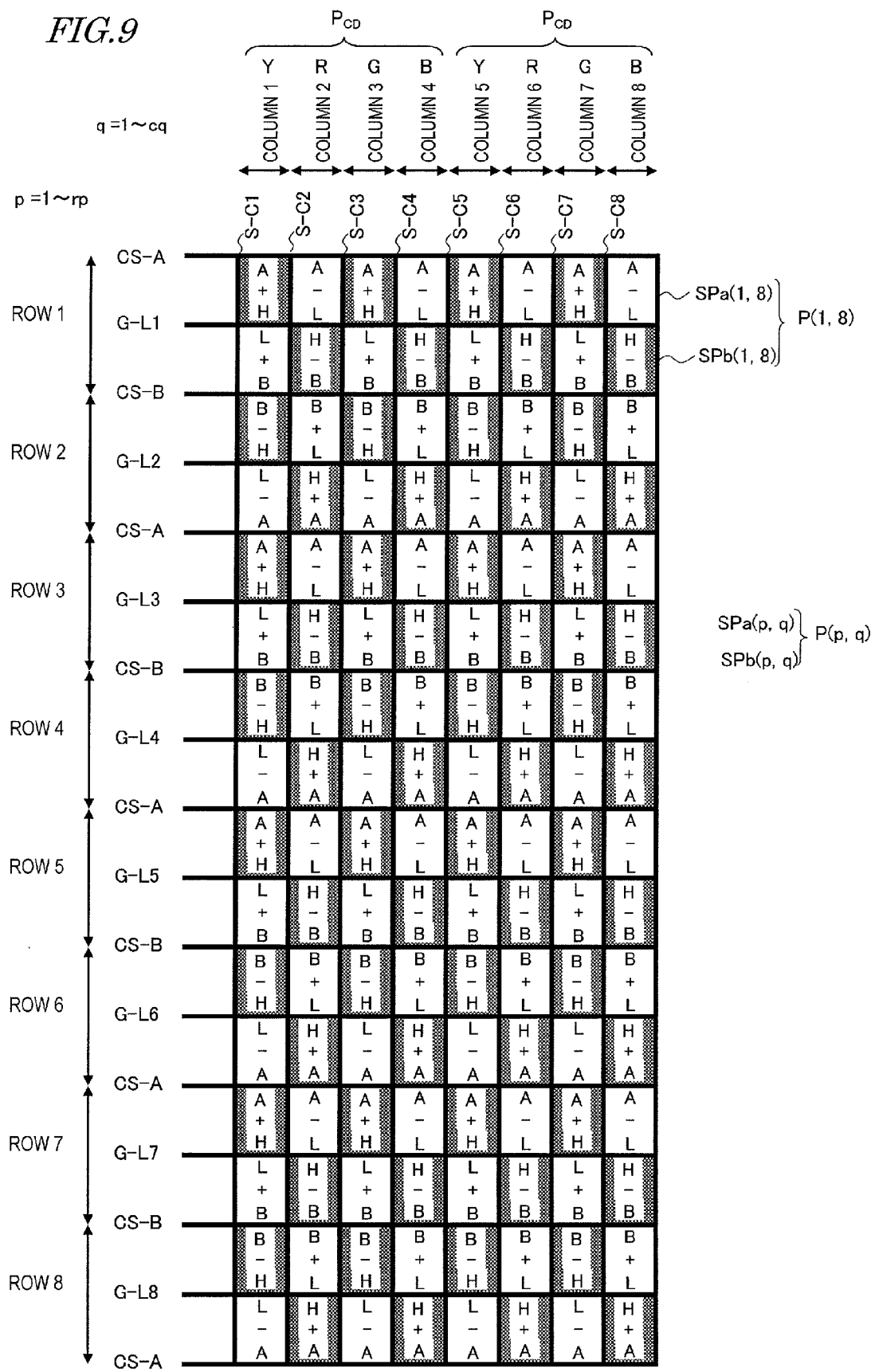
FIG. 9 A diagram schematically illustrating the display state of the liquid crystal display device of Patent Document No. 3 being driven by the one-dot inversion drive method.

FIG. 9 shows the display state to be produced when the liquid crystal display device disclosed in Patent Document No. 3 is a four-primary-color display device with a striped arrangement and is driven by the one dot inversion drive method. Also, the waveforms of respective voltages (or signals) to realize the display state shown in FIG. 9 are shown in portions (a) through (j) of FIG. 10.

In the example to be described below, a plurality of pixels are arranged in columns (1 to cq) and rows (1 to rp) so as to form a matrix pattern (rp, cq), and each pixel P(p, q) (where 1≤p≤rp and 1≤q≤cq) has two subpixels SPa(p, q) and SPb(p, q). FIG. 9 schematically illustrates a part of the relative arrangement (8 rows×6 columns) of source bus lines S-C1, S-C2, S-C3, S-C4, . . . and S-Ccq; gate bus lines G-L1, G-L2, G-L3, . . . and G-Lrp; CS bus lines CS-A and CS-B; pixels P (p, q); and subpixels SPa(p, q) and SPb (p, q) of the respective pixels.

In this example, these pixels P form multiple color display pixels $P_{CD}$, each of which is comprised of first, second, third and fourth pixels that are arranged in the row direction. In the example illustrated in FIG. 9, one color display pixel $P_{CD}$ is comprised of Y, R, G and B pixels.

As shown in FIG. 9, each pixel P(p, q) has subpixels SPa(p, q) and SPb(p, q) over and under its associated gate bus line G-Lp that extends horizontally approximately through the center of the pixel. That is to say, the subpixels SPa(p, q) and SPb(p, q) of each pixel are arranged in the column direction. In each of the subpixels SPa(p, q) and SPb(p, q), one of the two storage capacitor electrodes (not shown) thereof is connected to an adjacent CS bus line CS-A or CS-B. Also, a source bus line S-Cq to supply a signal voltage representing an image to be presented to the pixels P(p, q) runs vertically (in the column direction) between those pixels to supply the signal voltage to the TFTs (not shown) of the subpixels (or pixels) on the right-hand side of that source bus line. In the arrangement shown in FIG. 9, one CS bus line or one gate bus line is shared by two subpixels, thus achieving the effect of increasing the aperture ratio of the pixels.

Figure 10:
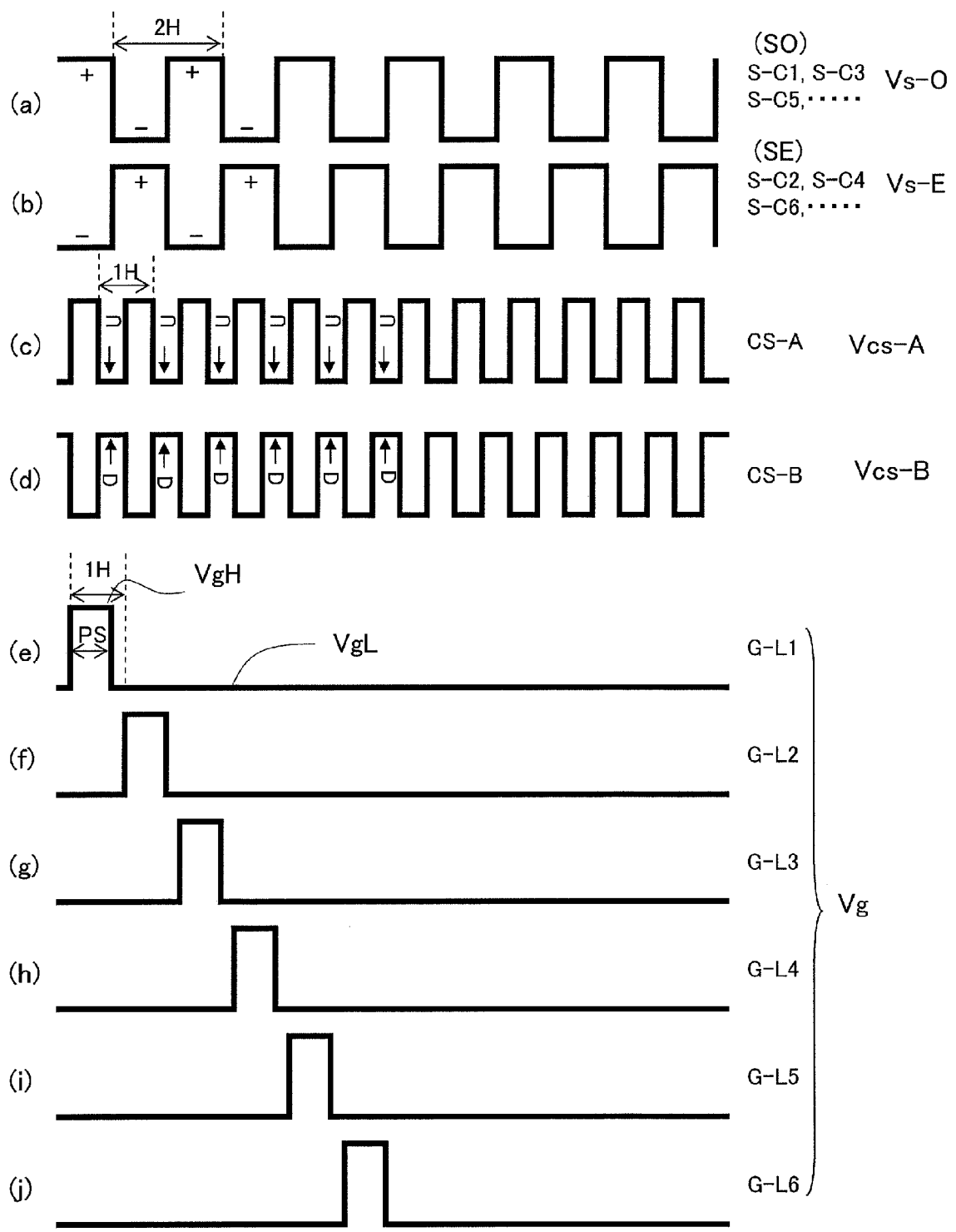
FIG. 10 (a) through (j) show the waveforms of various voltages (signals) to realize the display state shown in FIG. 9.

By driving a liquid crystal display device with the configuration shown in FIG. 9 with voltages that have the voltage waveforms shown in portions (a) through (j) of FIG. 10, the one dot inversion drive can be carried out. In the following description, every pixel is supposed to be displaying a certain grayscale for the sake of simplicity.

Specifically, portion (a) of FIG. 10 shows the waveform of a display signal voltage (i.e., the waveform of a source signal voltage) to be supplied to the source bus lines S-C1, S-C3, S-C5, . . . and so on (such a group of odd-numbered source bus lines will be sometimes identified herein by S-O). Portion (b) of FIG. 10 shows the waveform of a display signal voltage to be supplied to the source bus lines S-C2, S-C4, S-C6, . . . and so on (such a group of even-numbered source bus lines will be sometimes identified herein by S-E). Portion (c) of FIG. 10 shows the waveform of a storage capacitor counter voltage supplied to a CS bus line CS-A and portion (d) of FIG. 10 shows the waveform of a storage capacitor counter voltage supplied to a CS bus line CS-B. And portions (e), (f), (g), (h), (i) and (j) of FIG. 10 show the waveforms of gate signal voltages supplied to gate bus lines G-L1, G-L2, G-L3, G-L4, G-L5, and G-L6, respectively. A period between a point in time when a voltage on one gate bus line changes from low level VgL into high level VgH and a point in time when a voltage on the next gate bus line changes from VgL into VgH is one horizontal scanning period (1H). Also, a period in which a voltage on a gate bus line keeps a high level (VgH) will be sometimes referred to herein as a "selected period PS".

Since every pixel is supposed to be displaying a certain grayscale in this example, the display signal voltages (source signal voltages) shown in portions (a) and (b) of FIG. 10 have an oscillating waveform, of which the amplitude is always constant. One period of oscillation of the display signal voltage is two horizontal scanning periods (2H) and the polarity of the display signal voltage inverts every row. Also, the voltage waveforms of the source bus line S-O (which may be S-C1, S-C3, and so on) and the source bus line S-E (which may be S-C2, S-C4, and so on) have phases that are different from each other by 180 degrees, and the display signal voltage inverts its polarity every column. As a result, the one dot inversion drive can be carried out.

In general, in driving a TFT, when a voltage on a source bus line is applied to a subpixel electrode via the TFT, that voltage will slightly vary due to a variation in the waveform of the gate signal voltage. Such a phenomenon is sometimes called a "feedthrough phenomenon". Thus, in view of such a feedthrough phenomenon, the counter voltage is set to be approximately a center value of the voltage waveform after the voltage on the source bus line has been applied to the subpixel electrode. In portions (a) and (b) of FIG. 10, a signal voltage corresponding to the waveform of a voltage that is applied to a subpixel electrode as a voltage that is higher than the counter voltage is identified by the sign "+", while a signal voltage corresponding to the waveform of a voltage that is applied to a pixel electrode as a voltage that is lower than the counter voltage is identified by the sign "−" These signs "+" and "−" correspond to the directions of the electric field applied to the liquid crystal layer. That is to say, the direction of the electric field applied to the liquid crystal layer when the sign is "+" is opposite to that of the electric field applied to it when the sign is "−".

When a gate signal voltage on one gate bus line is VgH, a TFT connected to that gate bus line turns ON and the subpixel connected to that TFT is supplied with its display signal voltage. Next, after the voltage on that gate bus line gone VgL, the storage capacitor counter voltage changes. And as that storage capacitor counter voltage changes differently in terms of the magnitude, direction and sign of the variation with respect to two subpixels, the effective voltages applied to the respective liquid crystal layers of those subpixels become different from each other.

As shown in portion (c) and (d) of FIG. 10, in this example, the storage capacitor counter voltages on the CS bus lines CS-A and CS-B oscillate with the same amplitude and in the same period. For example, their amplitude may be twice as large as Vad (see FIG. 10) and their period may be 1 H. And if the phase of the oscillating waveform of one of CS-A and CS-B is shifted by 180 degrees, then that phase will match with that of the other's oscillating waveform. That is to say, their phases have a shift of 0.5H. If the first variation in voltage on a CS bus line associated with a given subpixel electrode is increase after the voltage on its associated gate bus line has changed from VgH into VgL, the average voltage applied to that subpixel electrode becomes higher than the display signal voltage on its associated source bus line when the voltage on its associated gate bus line is VgH. On the other hand, if the first variation in voltage on its associated CS bus line is decrease, the average voltage applied to that subpixel electrode becomes lower than the display signal voltage on its associated source bus line when the voltage on its associated gate bus line is VgH.

As a result, if the sign attached to the display signal voltage shown in portion (a) and (b) of FIG. 10 is "+" and if the variation in voltage on a CS bus line is increase, the effective voltage applied to the liquid crystal layer becomes higher than when the voltage variation is decrease. On the other hand, if the sign attached to the display signal voltage shown in portion (a) and (b) of FIG. 10 is "−" and if the variation in voltage on a CS bus line is increase, the effective voltage applied to the liquid crystal layer becomes lower than when the voltage variation is decrease.

FIG. 9 shows the states of each pixel P(p, q) and its subpixels SPa(p, q) and SPb(p, q) in one vertical scanning period (which will be referred to herein as a "frame period"). The following three signs that are arranged symmetrically with respect to a gate bus line associated with each pair of subpixels indicate the states of those subpixels.

The first sign "H" or "L" indicates which of the two effective voltages applied to those two subpixels is higher or lower than the other. That is to say, the sign "H" indicates that the effective voltage applied is relatively high and the sign "L" indicates that the effective voltage applied is relatively low. The second sign "+" or "−" indicates which of the two voltages applied to the counter electrode and the subpixel electrode is higher than the other (i.e., the direction of the electric field applied to the liquid crystal layer of that subpixel). That is to say, the sign "+" indicates that the voltage applied to the subpixel electrode is higher than the one applied to the counter electrode and the sign "−" indicates that the voltage applied to the subpixel electrode is lower than the one applied to the counter electrode. And the third sign "A" or "B" indicates whether the given CS bus line is CS-A or CS-B.

For example, check out the states of the subpixels SPa(1, 1) and SPb(1, 1) of the pixel P(1, 1). As can be seen from portions (a) and (e) of FIG. 10, in the period in which GL-1 is selected (i.e., the period PS in which the voltage on that gate bus line is VgH), the display signal voltage is "+". Also, when the gate signal voltage on GL-1 changes from VgH into VgL, the voltages on two CS bus lines associated with the two subpixels are in the states as indicated by the arrows (i.e., the leftmost set of arrows) shown in portion (c) and (d) of FIG. 10. Thus, the first variation in the storage capacitor counter voltage applied to SPa(1, 1) after the gate signal voltage on GL-1 has changed from VgH into VgL is "increase" (which is indicated by "U") as can be seen from portion (c) of FIG. 10. On the other hand, the first variation in the storage capacitor counter voltage applied to SPb(1, 1) after the gate signal voltage on GL-1 has changed from VgH into VgL is "decrease" (which is indicated by "D") as can be seen from portion (d) of FIG. 10. Consequently, the effective voltage applied to SPa(1, 1) increases but the one applied to SPb(1, 1) decreases. As a result, the effective voltage applied to SPa(1, 1) becomes higher than the one applied to SPb(1, 1), and therefore, the signs "H" and "L" are attached to SPa(1, 1) and SPb(1, 1), respectively.

As for the subpixels SPa(1, 2) and SPb(1, 2) of the pixel P(1, 2), in the period in which GL-1 is selected, the display signal voltage is "−" as can be seen from portion (b) of FIG. 10. Also, when the gate signal voltage on GL-1 changes from VgH into VgL, the voltages on two CS bus lines associated with the two subpixels are in the states as indicated by the arrows (i.e., the leftmost set of arrows) shown in portion (c) and (d) of FIG. 10. Thus, the first variation in the storage capacitor counter voltage applied to SPa(1, 2) after the gate signal voltage on GL-1 has changed from VgH into VgL is "increase" (which is indicated by "U") as can be seen from portion (c) of FIG. 10. On the other hand, the first variation in the storage capacitor counter voltage applied to SPb(1, 2) after the gate signal voltage on GL-1 has changed from VgH into VgL is "decrease" (which is indicated by "D") as can be seen from portion (d) of FIG. 9. Consequently, the effective voltage applied to SPa(1, 2) decreases but the one applied to SPb(1, 2) increases. As a result, the effective voltage applied to SPa(1, 2) becomes lower than the one applied to SPb(1, 2), and therefore, the signs "L" and "H" are attached to SPa(1, 2) and SPb(1, 2), respectively.

Furthermore, as for the subpixels SPa(2, 1) and SPb(2, 1) of the pixel P(2, 1), in the period in which GL-2 is selected, the display signal voltage is "−" as can be seen from portion (a) of FIG. 10. Also, when the gate signal voltage on GL-2 changes from VgH into VgL, the voltages on two CS bus lines associated with the two subpixels are in the states as indicated by the arrows (i.e., the second leftmost set of arrows) shown in portion (c) and (d) of FIG. 10. Thus, the first variation in the storage capacitor counter voltage applied to SPa(2, 1) after the gate signal voltage on GL-1 has changed from VgH into VgL is "decrease" (which is indicated by "D") as can be seen from portion (d) of FIG. 10. On the other hand, the first variation in the storage capacitor counter voltage applied to SPb(2, 1) after the gate signal voltage on GL-2 has changed from VgH into VgL is "increase" (which is indicated by "U") as can be seen from portion (c) of FIG. 10. Consequently, the effective voltage applied to SPa(2, 1) increases but the one applied to SPb(2, 1) decreases. As a result, the effective voltage applied to SPa(2, 1) becomes higher than the one applied to SPb(2, 1), and therefore, the signs "H" and "L" are attached to SPa(2, 1) and SPb(1, 2), respectively. It can be seen that the respective subpixels come have the states shown in FIG. 9 in this manner.

Optionally, if the phase of the voltage waveform on each source bus line S-O (shown in portion (a) of FIG. 10) or S-E (shown in portion (b) of FIG. 10) is shifted by 180 degrees in the frame that follows the frame shown in FIG. 10, an AC drive in which the direction of the electric field applied to the liquid crystal layer inverts every frame period can be carried out.

Furthermore, to prevent the order of the magnitudes of the effective voltages applied to the respective subpixels of each pixel (i.e., the arrangement of the respective orders of the magnitudes of those subpixels' luminances within the display screen as indicated by the arrangement pattern of the signs "H" and "L" in FIG. 9) from changing every frame, whenever the phase of the voltage waveform on a source bus line is shifted, the phase of the voltage waveforms on the CS bus lines CS-A and CS-B may also be shifted by 180 degrees. Then, in the frame that follows the one shown in FIG. 9, each set of the signs "+" and "−" shown in FIG. 9 can be exchanged with each other (e.g., (+, H) ⇔ (−, H) and (+, L) ⇔ (−, L)).

As shown in FIG. 9, the signs "+" and "−" indicating the polarities (i.e., the directions of the electric field) of the respective pixels invert in a period of two pixels (i.e., two columns) both in the row direction (i.e., horizontally) and in the column direction (i.e., vertically) in the order of (+, −), (+, −), (+, −), (+, −), and so on. That is to say, one dot inversion is realized when viewed on a pixel basis.

Next, subpixels of a high luminance rank (i.e., bright subpixels identified by the sign "H" in FIG. 9) will be considered. As for the row direction (e.g., as for SPa on the first row), their polarities do not invert and remain +H, +H, +H and so on. In the column direction (e.g., as for the first column, for example), on the other hand, their polarities invert in a period of two pixels (i.e., two rows) in the order of (+H, −H), (+H, −H), (+H, −H), (+H, −H), and so on. That is to say, the line inversion drive is realized as for such subpixels of a high luminance rank. Dark subpixels identified by the sign "L" are also arranged in a similar regular pattern.

As shown in FIG. 9, if the one dot inversion drive is carried out on a four-primary-color display device by the multi-pixel driving method disclosed in Patent Document No. 3, the pixels that form two color display pixels that are adjacent to each other in the row direction are arranged as Y (+), R (−), G (+), B (−), Y (+), R (−), G (+) and B (−) as in the first row of pixels shown in FIG. 9. And in accordance with these polarities, the respective positions of the bright subpixels in the column direction become Y (top), R (bottom), G (top), B (bottom), Y (top), R (bottom), G (top) and B (bottom). Consequently, in the two color display pixels that are adjacent to each other in the row direction, two Y bright subpixels and two G bright subpixels are arranged in their upper halves and two R bright subpixels and two B bright subpixels are arranged in their lower halves. In that case, when lines in a halftone achromatic color (i.e., in grey) are displayed parallel to each other in the row direction, the upper edges will look colored due to the influence of the Y and G bright subpixels, and the lower edges will look colored due to the influence of the R and B bright subpixels.

Figure 3:
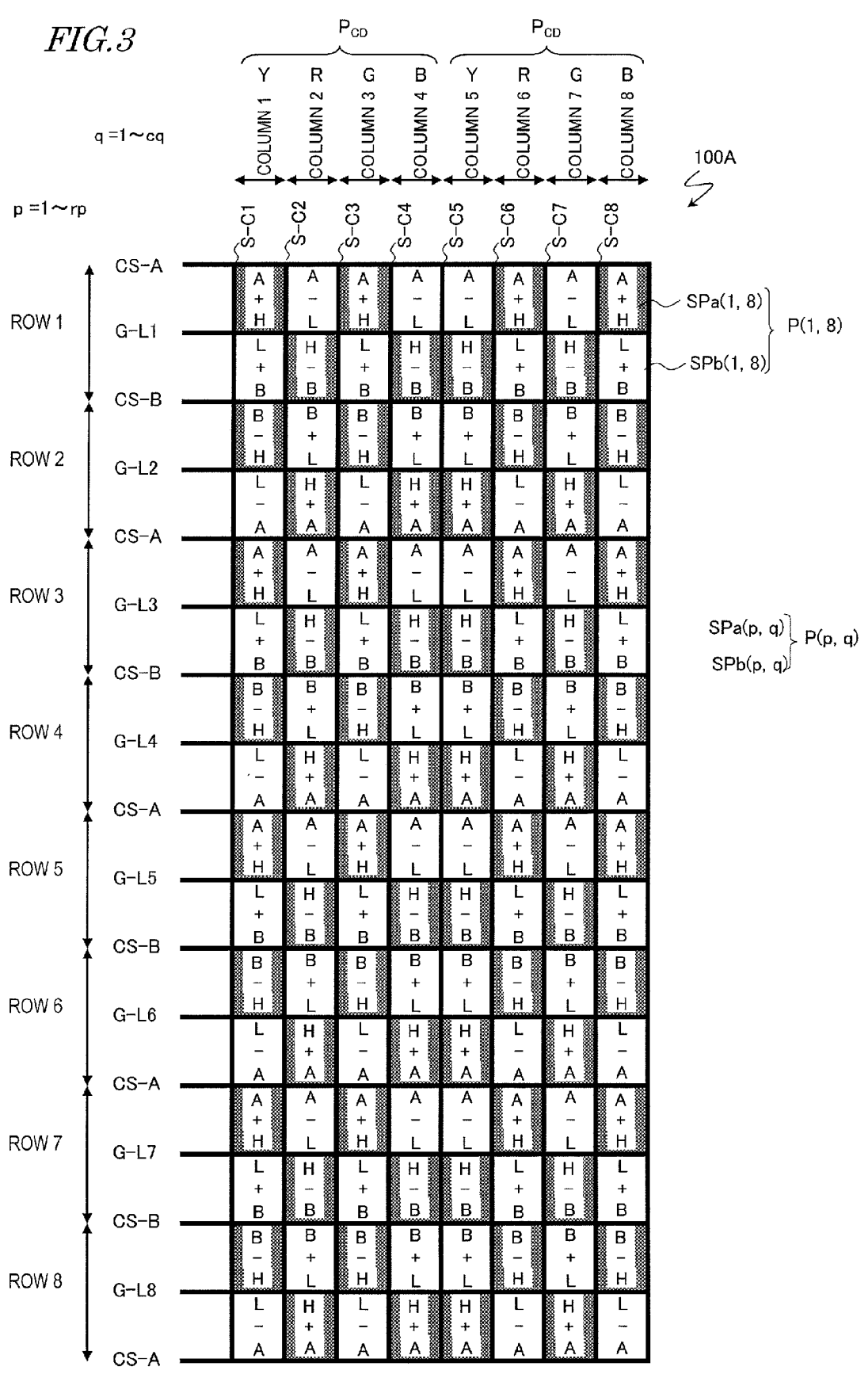

Next, it will be described with reference to FIG. 3 how the liquid crystal display device 100A according to the first embodiment of the present invention can overcome such a problem. FIG. 3 schematically illustrates the display state in a situation where the liquid crystal display device 100A of the first embodiment is driven by the one dot inversion drive method. FIG. 3 corresponds to, and uses the same signs as, FIG. 9.

The liquid crystal display device 100A of the first embodiment has the pixel structure shown in FIGS. 1 and 2(a). Differences between the display states shown in FIGS. 3 and 9 lie in the distribution of the respective polarities of the fifth through eighth columns of pixels and the arrangement in the column direction of bright subpixels in color display pixels that are formed by those fifth through eighth columns of pixels. The display state shown in FIG. 3 is obtained by setting the polarity of the display signal voltages applied to the fifth through eighth columns of pixels through S-C5 to S-C8 to be opposite to that of the display signal voltages applied to the first through fourth columns of pixels through S-C1 to S-C4.

If attention is paid to the first row of pixels shown in FIG. 3, the pixels that form two color display pixels that are adjacent to each other in the row direction are arranged as Y (+), R (−), G (+), B (−), Y (−), R (+), G (−) and B (+). And in accordance with these polarities, the respective positions of the bright subpixels in the column direction become Y (top), R (bottom), G (top), B (bottom), Y (bottom), R (top), G (bottom) and B (top). Consequently, the arrangement in the column direction of the bright and dark subpixels in one of the two color display pixels that are adjacent to each other is opposite to their arrangement in the other color display pixel. As a result, bright subpixels in all of the four primary colors of Y, R, G and B are included in not only the upper half but also the lower half in the column direction of the two color display pixels that are adjacent to each other in the row direction. In that case, when lines in a halftone achromatic color (i.e., in grey) are displayed parallel to each other in the row direction, both of the upper and lower edges will be represented by the bright subpixels in the four primary colors. Consequently, unlike the multi-pixel drive method disclosed in Patent Document No. 3, those edges of the line do not look colored.

In this example, the bright subpixels in all of the four primary colors are supposed to be included in two color display pixels that are adjacent to each other in the row direction. However, this is just an embodiment of the present invention. Rather, any other arrangement may be adopted as well as long as every row of subpixels including bright subpixels includes bright subpixels in all of the four primary colors. Naturally, it is beneficial to adopt the configuration described above in which two adjacent color display pixels include bright subpixels in all of the four primary colors because color smearing is much less easily sensible over the entire display area in that case.

Even in the display state shown in FIG. 3, in an arbitrary color display pixel, the display signal voltages applied to two adjacent pixels have mutually opposite polarities, and the polarity inverts every column. Naturally, as for the row direction, the polarity inverts every row as in FIG. 9. In the fourth and fifth columns, which define the boundary between two color display pixels, the display signal voltages have the same polarity and the column-by-column polarity inversion is not realized there. As a whole, however, a polarity distribution similar to the one achieved by the one-dot inversion drive can be obtained, and therefore, flicker can be avoided.

Next, it will be described with reference to FIGS. 4 and 5 how a liquid crystal display device 100A as a second embodiment of the present invention can overcome the problem described above.

FIG. 4 shows the waveforms of various voltages (or signals) to drive the liquid crystal display device 100A as a second embodiment of the present invention. In FIG. 4, shown are gate signal voltages Vg(m) through Vg(m+7), CS signal voltages Vcsa and Vcsb, and voltages Vlca(m) through Vlca(m+7) and Vlcb(m) to be applied to the respective liquid crystal layers of subpixels. Specifically, Vlca(m) through Vlca(m+7) represent the waveforms of the voltages applied to the respective liquid crystal layers of bright subpixels. On the other hand, since the voltages applied to the respective liquid crystal layers of dark subpixels have the same waveform in any row of pixels, only Vlcb(m) is shown in FIG. 4. It should be noted that if display signal voltages with the waveforms shown in portions (a) and (b) of FIG. 10 are used as the display signal voltages to be supplied to source bus lines, the one dot inversion drive can be carried out.

As shown in FIG. 4, the voltage waveform of the oscillation voltage Vcsa applied to the CS bus line 24a (associated with bright subpixels) of the liquid crystal display device 100A of the second embodiment has at least three potentials, which include two potentials that define the maximum amplitude Vcsa(p-p) of the oscillation voltage (corresponding to 2 Vadd), and one potential that agrees with the average potential of the oscillation voltage. In this case, the "average potential of the oscillation voltage" does not always refer to a simple average of the two potentials that define the maximum amplitude of the oscillation voltage but to an "effective average" of the oscillation voltage. More specifically, in one period of the oscillation voltage waveform, the sum of the areas of portions that are higher than the average potential becomes equal to that of the areas of portions that are lower than it. It should be noted that the oscillation voltage to be described below has a waveform that is symmetric with respect to the centerline between two potentials that define the maximum amplitude, the simple average of those two potentials that define the maximum amplitude of the oscillation voltage agrees with the effective average of the oscillation voltage.

Also, in a period of time in which the oscillation voltage has a potential that is equal to the average potential of the oscillation voltage waveform (i.e., in the flat portion), TFTs, belonging to the pixels that are connected to the CS bus line to which that oscillation voltage is applied, are turned OFF. In the following example, the instant the gate bus line voltage decreases to VgL to turn OFF the TFTs is in the middle of the period in which the oscillation voltage has the average potential. In this example, the oscillation voltage waveform has the three potentials described above. However, the oscillation voltage waveform may also have more than three potentials (e.g., five, seven or nine potentials) as well as long as those three potential are included.

The effective voltage V1 applied to the respective liquid crystal layers of the bright subpixels is obtained by calculating the integral of the squared amplitudes of the hatched portions of Vlca(m) shown in FIG. 4 with time and then calculating its average with time. In this case, the effective voltages are obtained for one vertical scanning period. On the other hand, the effective voltage V2 applied to the respective liquid crystal layers of the dark subpixels is obtained by calculating the integral of the squared amplitudes of the hatched portions of Vlcb(m) shown in FIG. 4 and then calculating its squared average. Consequently, since the oscillation voltage is superposed on the display signal voltage, the effective voltage V1 is greater than the effective voltage V2 irrespective of the polarity of the display oscillation voltage. Also, by making settings so that the moment when the gate bus line voltage becomes VgL to turn the TFTs OFF falls within, and is located just at the middle of, a period in which the oscillation voltage has an average potential, it is possible to prevent the average of the voltages applied to the respective liquid crystal layers of the bright subpixels from varying under the influence of the oscillation voltage. In this respect, the entire disclosure of Japanese Laid-Open Patent Publication No. 2005-99746 is hereby incorporated by reference.

As described above, it would be best to set the moment when the TFTs are turned OFF at just the middle of the period in which the oscillation voltage has the average potential. However, as long as the moment when the TFTs are turned OFF falls within the period in which the oscillation voltage has the average potential, the average of the voltages applied to the respective liquid crystal layers can be substantially constant. Also, it is beneficial if the potential of the oscillation voltage when the TFTs are turned OFF is the average of the oscillation voltage as described above. However, as long as that potential is between the two potentials that define the maximum amplitude, the display states shown in FIGS. 6A and 6B are realized to say the least.

Figure 5:
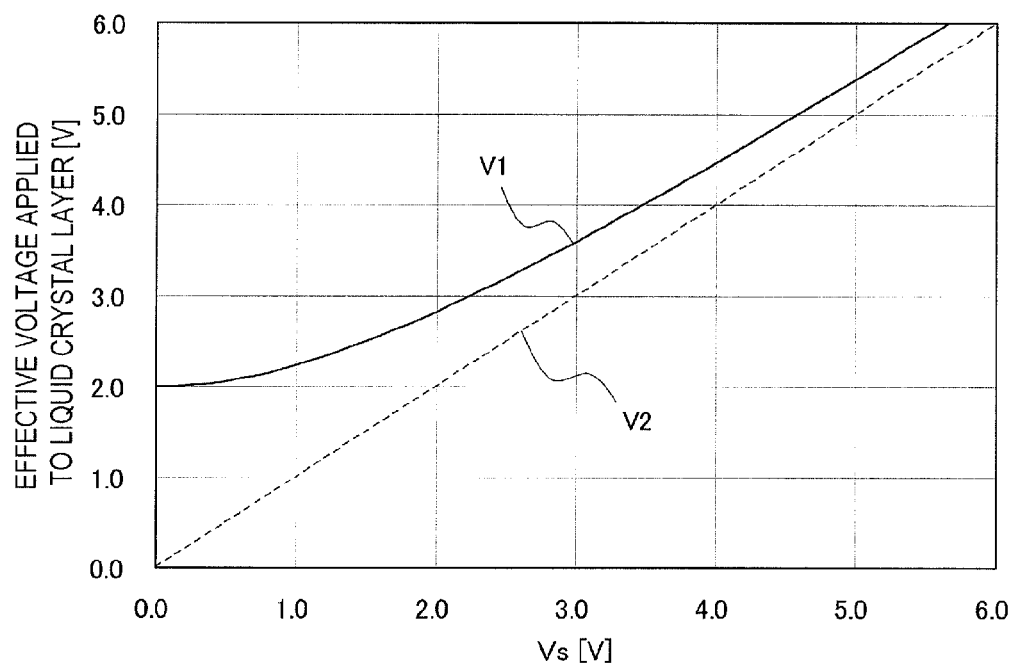
FIG. 5 A graph showing how the effective voltages V1 and V2 applied to the respective liquid crystal layers of subpixels change with the display signal voltage Vs in the liquid crystal display device 100A of the second embodiment.

FIG. 5 is a graph showing how the effective voltages V1 and V2 applied to the respective liquid crystal layers of subpixels change with the display signal voltage Vs when an oscillation voltage with an amplitude 2Vadd is applied. In this case, the value of 2Vadd is set so that when the display signal voltage is 0 volts, the V1 value becomes equal to 2 V. The greater the 2Vadd value, the larger the V1 value, too.

The larger the display signal voltage value, the closer to the display signal voltage value the V1 value gets. On the other hand, the V2 value is always equal to the display signal voltage value. Thus, it can be seen that in this liquid crystal display device 100A, V1 and V2 also satisfy the relation shown in FIG. 7 as in the liquid crystal display device of Patent Document No. 3, and the viewing angle dependence of the γ characteristic can also be reduced no less effectively.

Figure 6A:
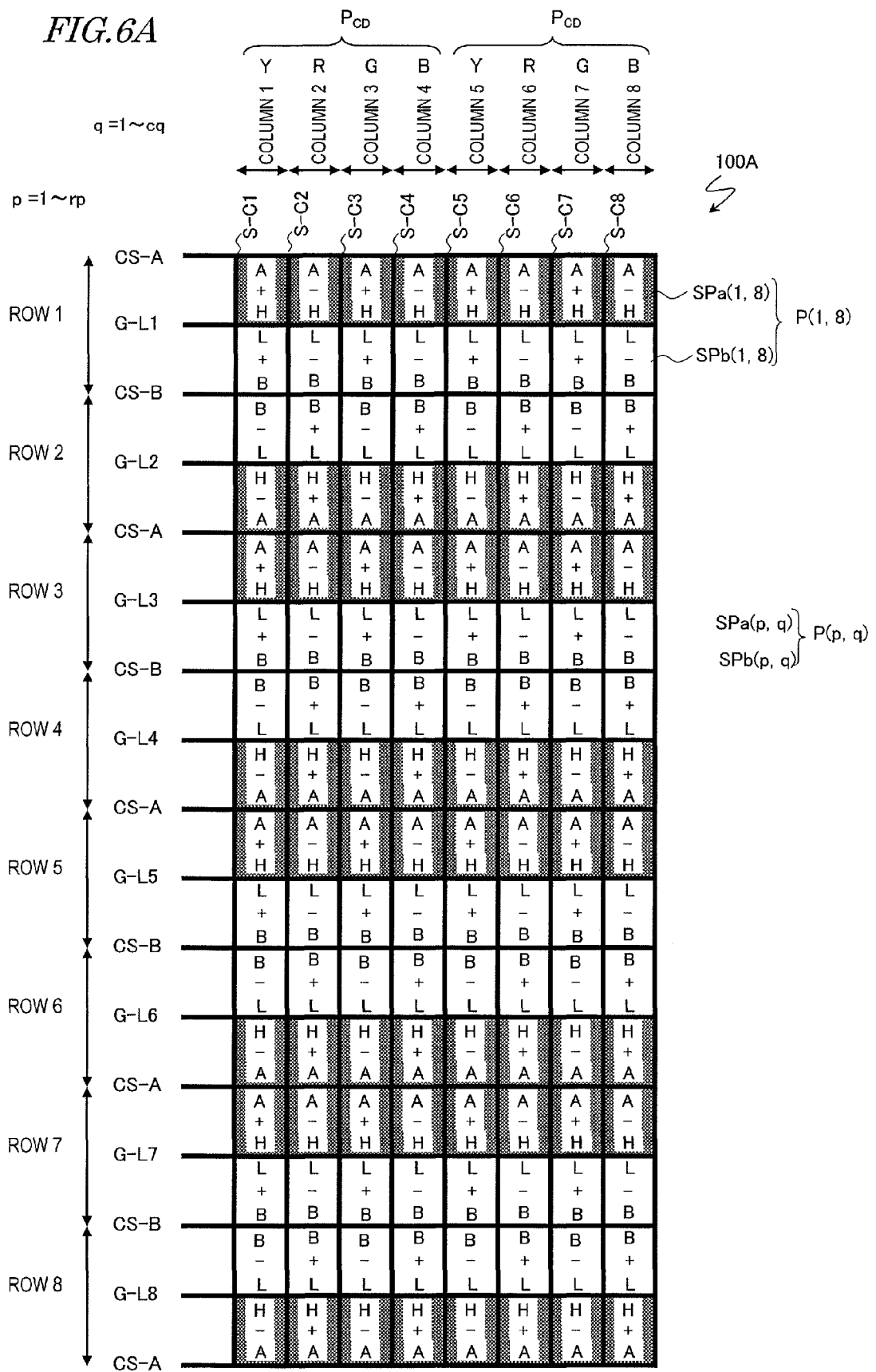
FIG. 6A A diagram schematically illustrating another display state of the liquid crystal display device 100A of the second embodiment being driven by a one-dot inversion drive method.
Figure 6B:
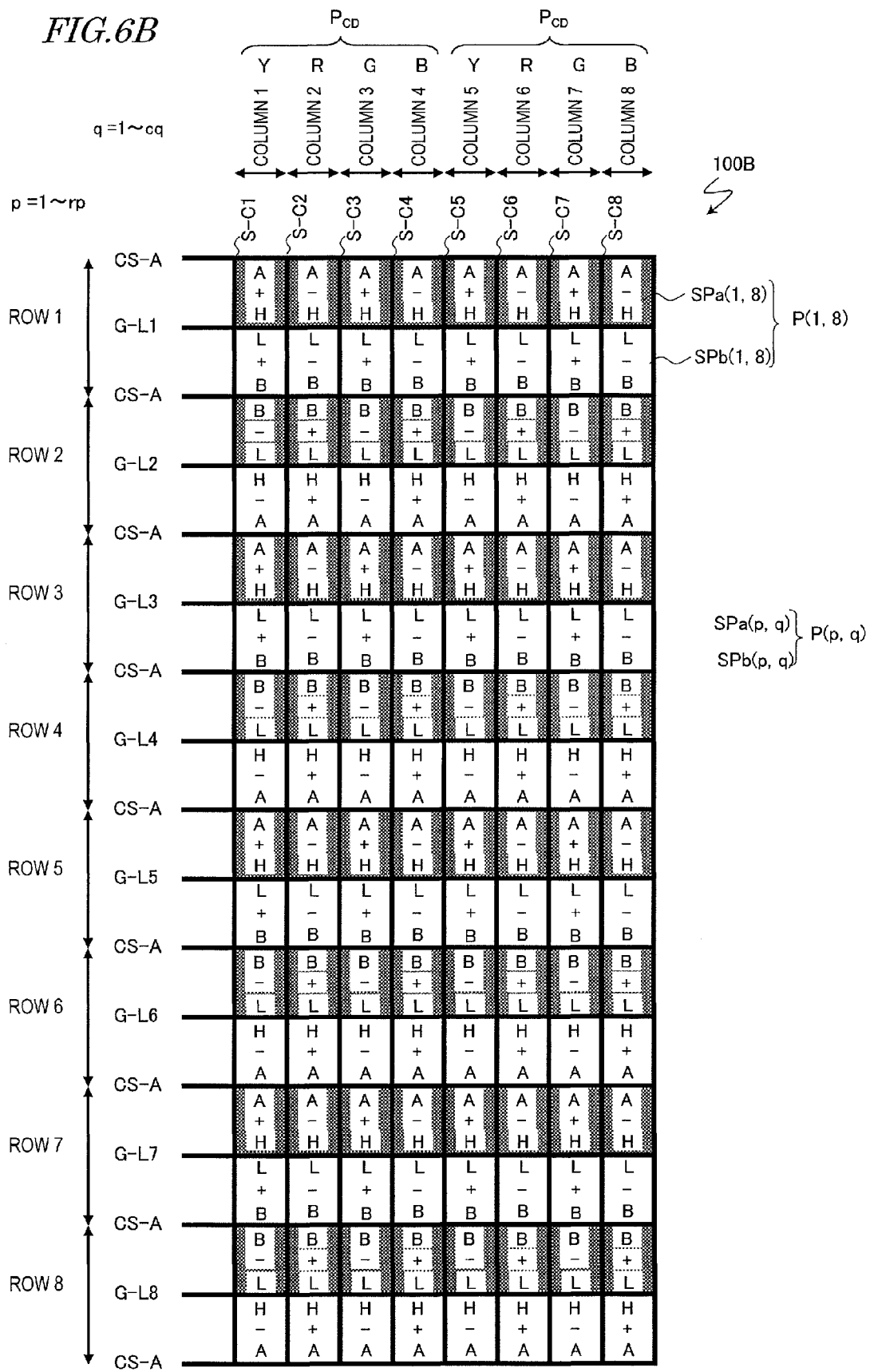
FIG. 6B A diagram schematically illustrating the display state of the liquid crystal display device 100B of the second embodiment being driven by the one-dot inversion drive method.

FIG. 6A schematically illustrates a display state when the liquid crystal display device 100A of this second embodiment is driven by the one-dot inversion drive method. FIG. 6A corresponds to FIG. 9 that has already been referred to, and uses the same signs as what is used in FIG. 9.

As can be seen from FIG. 6A, in the liquid crystal display device 100A of the second embodiment, subpixels SPa associated with each CS bus line CS-A, to which an oscillation voltage Vcsa is supplied, become bright subpixels irrespective of the polarity of the display signal voltage. Thus, look at a row of pixels, and it can be seen that those pixels are arranged so that their respective bright subpixels are located at the same position in the column direction and arranged in line. For example, on the first row, the bright subpixels are arranged in the upper half of every pixel in the column direction. On the second row, on the other hand, the bright subpixels are arranged in the lower half of every pixel in the column direction. Next, on the third row, the bright subpixels are arranged in the upper half of every pixel in the column direction. And on the fourth row, the bright subpixels are arranged in the lower half of every pixel in the column direction. In this manner, the respective bright subpixels of a column of pixels alternately change their positions vertically one row after another because a configuration in which a single CS bus line is shared by a plurality of pixels that are adjacent to each other in the column direction is adopted in this embodiment. If two CS bus lines are provided for each pixel, however, the bright subpixels can be arranged in the upper half of every pixel in the column direction (see FIG. 6B).

Also, as shown in FIG. 6A, look at any two color display pixels that are adjacent to each other in an arbitrary row of pixels, and it can be seen that every bright subpixel thereof is located at the same position in the column direction, so does every dark subpixel thereof. As a result, bright subpixels in all of the four primary colors of Y, G, R, and B are included in not only the upper half but also the lower half in the column direction of every color display pixel. Consequently, when lines in a halftone achromatic color (i.e., in grey) are displayed parallel to each other in the row direction, both of the upper and lower edges will be represented by the bright subpixels in the four primary colors. That is why unlike the multi-pixel drive method disclosed in Patent Document No. 3, those edges of the line do not look colored.

As shown in FIG. 9, if the one dot inversion drive is carried out by the multi-pixel driving method disclosed in Patent Document No. 3, then bright subpixels will be arranged in the checkerboard pattern. For example, look at a row of pixel, and it can be seen that bright subpixels are arranged in a zigzag pattern in the row direction in accordance with the arrangement of the polarities of the display signal voltages applied to the respective liquid crystal layers of the pixels. That is to say, if the bright subpixel is located in the upper half of a pixel when viewed in the column direction, then the bright subpixel will be located in the lower half of another pixel, which is adjacent to the former in the row direction, when viewed in the column direction. Consequently, when lines that are parallel to each other in the row direction are displayed, those lines will look smeared, which is a problem.

On the other hand, in the liquid crystal display device 100A of the second embodiment, if attention is paid to one row of pixels, the respective bright subpixels of those pixels are arranged at the same position in the column direction and form a line. Consequently, even when lines that are parallel to each other in the row direction are displayed, those lines will not look smeared.

As shown in FIG. 6A, the signs "+" and "−" indicating the polarities (i.e., the directions of the electric field) of the respective pixels invert in a period of two pixels (i.e., two columns) both in the row direction (i.e., horizontally) and in the column direction (i.e., vertically) in the order of (+, −), (+, −), (+, −), (+, −), and so on. That is to say, one dot inversion is realized when viewed on a pixel basis.

Next, subpixels of a high luminance rank (i.e., subpixels identified by the sign "H" in FIG. 6A) will be considered. As for the row direction (e.g., as for SPa on the first row), their polarities invert in a period of two pixels (i.e., two rows) in the order of (+H, −H), (+H, −H), (+H, −H), and so on. In the column direction (e.g., as for the first column, for example), on the other hand, their polarities invert in a period of two pixels (i.e., two rows) in the order of (+H, −H), (+H, −H), (+H, −H), (+H, −H), and so on. That is to say, the one-dot inversion drive is also realized as for such subpixels of a high luminance rank. Subpixels identified by the sign "L" are also arranged in a similar regular pattern.

Thus, it can be seen that in the liquid crystal display device 100A of this embodiment, the polarities of the voltages applied to the respective liquid crystal layers are distributed on a smaller unit, and flicker is much less likely to occur, than in the liquid crystal display device of Patent Document No. 3 shown in FIG. 8.

Even in the liquid crystal display device 100B of the second embodiment shown in FIG. 2(b), a row of pixels can also be arranged so that their respective bright subpixels are located at the same position in the column direction and arranged in line as in the liquid crystal display device 100A. FIG. 6B schematically illustrates how the liquid crystal display device 100B performs a display operation when driven by the one-dot inversion drive using the same signal voltages as what has already been described for the liquid crystal display device 100A. It should be noted that the liquid crystal display device 100B does not have the storage capacitors 22b of the liquid crystal display device 100A, and therefore, does not need the CS signal voltage Vcb.

Comparing FIG. 6B to FIG. 6A, it can be seen easily that the bright subpixel of every pixel on a row is located at the same position in the column direction (i.e., in the upper position in this example) in FIG. 6B, which is a difference from the arrangement shown in FIG. 6A. In this liquid crystal display device 100B, the one-dot inversion drive can also be carried out not only on a pixel-by-pixel basis but also on a bright subpixel basis as well. On top of that, in this liquid crystal display device 100B, the bright subpixel of every pixel on a row is located at the same position in the column direction. That is to say, two pixels that are adjacent to each other in the row direction have their bright and dark subpixels arranged in the same pattern, so do two pixels that are adjacent to each other in the column direction. In other words, in this liquid crystal display device 100B, bright subpixels are never adjacent to each other in the column direction. Consequently, it can be said that the display state shown in FIG. 6B achieves a higher spatial resolution than the display state shown in FIG. 6A. It should be noted that if the storage capacitors 22b of the dark subpixels could not be omitted, the display state shown in FIG. 6B could be achieved by providing two CS bus lines for each pixel in the liquid crystal display device 100A as described above.

In the liquid crystal display devices 100A and 100B according to the second embodiment of the present invention, by determining, irrespective of the polarity of the display signal voltage, what subpixels the oscillation voltage needs to be applied to, subpixels to be the bright subpixels can be selected.

In the example described above, one color pixel is supposed to be comprised of four pixels in the four primary colors. However, this is just an embodiment of the present invention and those four primary colors do not have to be used. Rather, another embodiment of the present invention may be a liquid crystal display device with a striped arrangement which includes an even number of primary color pixels in the row direction. Furthermore, in the example described above, the four primary colors are supposed to be the colors yellow, red, green and blue. However, this is only an example. Optionally, when four primary colors are used, the color yellow may be replaced with the color cyan, magenta or white. Nevertheless, if the color yellow is used, the color reproduction range can be expanded without sacrificing the display luminance. On the other hand, if the color white is used, the color reproduction range cannot be expanded but the display luminance can be increased. Furthermore, those pixels representing the four primary colors do not have to have the same area but the area of the yellow and green pixels may be smaller than that of the red and blue pixels, for example.

In the example described above, the oscillation voltage Vcsa is supposed to be have a period of oscillation of 2H. However, one period of oscillation may also be 1H. But if one period of the oscillation voltage is short, then its waveform will get blunted due to a CR time constant of the CS bus line (i.e., an approximated value of the load impedance of the CS bus line). To avoid such a situation, one period of oscillation of the oscillation voltage is suitably at least eight times as long as the CR time constant of the CS bus line. In that case, however, the phases of the respective oscillation voltages need to be adjusted for each row of pixels so that the moment when the TFT turns OFF falls within a period in which the oscillation voltage has the third potential. For that purpose, N electrically independent CS trunk lines may be provided and be supplied with mutually different oscillation voltages. Then, the oscillation voltage can have an extended period with the condition described above satisfied. In terms of its idea about the relation between one period of the oscillation voltage and the number of electrically independent CS trunk lines, the entire disclosure of Japanese Patent Publication No. 4104639 is hereby incorporated by reference.

The multi-pixel drive does not have to be carried out in every grayscale but may be applied to only required ones. For example, if a display operation is conducted in 256 grayscales of #0 through #255, the multi-pixel drive could be turned ON only when the display operation is conducted in low grayscales (e.g., in either Grayscale #96 or less or Grayscale #64 or less). Since the γ characteristic of a normally black mode liquid crystal display device exhibits significant viewing angle dependence in such low grayscales, the viewing angle dependence of the γ characteristic can also be reduced even when such a driving method is adopted.

In the foregoing description, the row direction is supposed to be the horizontal direction on the display screen and the column direction is supposed to be the vertical direction there. However, these two directions may also be switched. That is to say, the gate bus lines may also be arranged to run vertically and the source bus lines may also be arranged to run horizontally. In other words, the row and column directions described above may be changed with each other. Also, in the foregoing description, the CS bus lines are supposed to run parallel to the gate bus lines. But the CS bus lines may also run parallel to the source bus lines.

INDUSTRIAL APPLICABILITY

The present invention is broadly applicable to not only an MVA mode liquid crystal display device but also PSA (polymer sustained alignment) mode, RTN mode (also called "VATN mode"), IPS mode and FSS mode liquid crystal display devices as well.

REFERENCE SIGNS LIST

10 pixel
10a, 10b subpixel
12 gate bus line
13a, 13b liquid crystal capacitor
14 source bus line
16a, 16b TFT
18a, 18b subpixel electrode
22a, 22b storage capacitor
24a, 24b CS bus line
100A, 100B liquid crystal display device

The invention claimed is:

1. A liquid crystal display device, comprising:
a plurality of pixels which are arranged in columns and rows to form a matrix pattern, each of the plurality of pixels including first and second subpixels, which are arranged adjacent to one another in a column direction, one of the first and second subpixels is a bright subpixel that exhibits a higher luminance than another of the first and second subpixels in at least at a particular grayscale, and the another of the first and second subpixels is a dark subpixel; wherein the plurality of pixels define a plurality of color display pixels, each of the plurality of color display pixels includes an even number of the plurality of pixels including first, second, third, and fourth pixels that respectively correspond to first, second, third, and fourth colors, and that are arranged in a row direction in a same order;

in an arbitrary row of the plurality of pixels, a row of subpixels including the bright subpixels includes respective ones of the bright subpixels of all of the first, second, third, and fourth pixels;

in each one of the plurality of pixels, a polarity of a voltage written to the bright subpixel and a polarity of a voltage written to the dark subpixel are the same; and the polarities of the voltages written to the bright subpixels and the polarities of the voltages written to the dark subpixels are reversed in directly adjacent ones of the plurality of color display pixels.

2. The liquid crystal display device of claim 1, wherein taking an arbitrary row of the plurality of pixels, an arrangement in the column direction of the bright and dark subpixels in one of two arbitrary adjacent ones of the plurality of color display pixels is opposite to an arrangement in another one of the two arbitrary adjacent ones of the plurality of color display pixels.

3. The liquid crystal display device of claim 2, comprising:
a plurality of source bus lines, each of which is associated with one of the columns of pixels;
a plurality of gate bus lines, each of which is associated with one of the rows of pixels;
a plurality of TFTs, each of which is associated with the first subpixel or the second subpixel of one of the plurality of pixels;
a plurality of first CS bus lines, each of which is associated with the first subpixel of a particular one of the pixels; and
a plurality of second CS bus lines, each of which is associated with the second subpixel of a particular one of the pixels, wherein
the first subpixel includes: a liquid crystal capacitor that is defined by a first subpixel electrode, a liquid crystal layer, and a counter electrode that faces the first subpixel electrode with the liquid crystal layer interposed therebetween; and a first storage capacitor that is defined by a first storage capacitor electrode that is electrically connected to the first subpixel electrode, an insulating layer, and a first storage capacitor counter electrode that faces the first storage capacitor electrode with the insulating layer interposed therebetween,
the second subpixel includes: a liquid crystal capacitor that is defined by a second subpixel electrode, the liquid crystal layer, and the counter electrode that faces the second subpixel electrode with the liquid crystal layer interposed therebetween; and a second storage capacitor that is defined by a second storage capacitor electrode that is electrically connected to the second subpixel electrode, the insulating layer, and a second storage capacitor counter electrode that faces the second storage capacitor electrode with the insulating layer interposed therebetween, when the TFTs associated with the first subpixel and the second subpixel are in an ON state, display signal voltages are supplied to the first and second subpixel electrodes and the first and second storage capacitor counter electrodes through their associated source bus lines, and wherein after the TFTs have been turned to an OFF state, voltages applied to the first and second storage capacitor counter electrodes vary, and the first and second subpixels cause mutually different variations, each of which is defined by the direction and magnitude of that variation, in an arbitrary one of the plurality of color display pixels, the display signal voltages applied to two adjacent ones of the plurality of pixels have mutually opposite polarities, and in an arbitrary row of the plurality of pixels, respective polarities of the display signal voltages applied to the first, second, third, and fourth pixels in one of two arbitrary adjacent color display pixels are opposite to respective polarities of the display signal voltages applied to the first, second, third, and fourth pixels in another one of the two arbitrary adjacent color display pixels.

4. The liquid crystal display device of claim 1, wherein taking an arbitrary row of the plurality of pixels, an arrangement in the column direction of the bright and dark subpixels in one of two arbitrary adjacent ones of the plurality of color display pixels is the same as an arrangement in the column direction of the bright and dark subpixels of another one of the two arbitrary adjacent ones of the plurality of color display pixels.

5. The liquid crystal display device of claim 4, comprising:
a plurality of source bus lines, each of which is associated with one of the columns of pixels;
a plurality of gate bus lines, each of which is associated with one of the rows of pixels;
a plurality of TFTs, each of which is associated with the first or second subpixel of one of the plurality of pixels; and
a plurality of first CS bus lines, each of which is associated with the first subpixel of a particular one of the pixels, wherein
the first subpixel includes: a liquid crystal capacitor that is defined by a first subpixel electrode, a liquid crystal layer, and a counter electrode that faces the first subpixel electrode with the liquid crystal layer interposed therebetween; and a first storage capacitor that is defined by a first storage capacitor electrode that is electrically connected to the first subpixel electrode, an insulating layer, and a first storage capacitor counter electrode that faces the first storage capacitor electrode with the insulating layer interposed therebetween, and
the second subpixel includes a liquid crystal capacitor that is formed by a second subpixel electrode, and the counter electrode that faces the second subpixel electrode with the liquid crystal layer interposed therebetween, and a first CS signal voltage applied to the first storage capacitor counter electrode through an associated one of the first CS bus lines is an oscillation voltage, of which one period is shorter than one vertical scanning period, that includes at least three potentials including first and second potentials that define the maximum amplitude and a third potential between the first and second potentials, and when a gate signal voltage to be supplied to one of the gate bus lines that is associated with an arbitrary one of the rows of pixels changes from a high level into a low level, the first CS signal voltage supplied to the associated first CS bus line is at the third potential.

6. The liquid crystal display device of claim 5, wherein the third potential is an average of the first and second potentials.

7. The liquid crystal display device of claim 5, further comprising a plurality of second CS bus lines, each of which is associated with the second subpixel of a particular one of the pixels, wherein
the second subpixel includes a second storage capacitor which is defined by a second storage capacitor electrode that is electrically connected to the second subpixel electrode, the insulating layer, and a second storage capacitor counter electrode that faces the second storage capacitor electrode with the insulating layer interposed therebetween, and
a second CS signal voltage to be applied to the second storage capacitor counter electrode through an associated one of the second CS bus lines is constant through one vertical scanning period.

8. The liquid crystal display device of claim 7, wherein the second CS signal voltage is equal to a counter voltage applied to the counter electrode.

9. The liquid crystal display device of claim 5, wherein the second subpixel does not include any storage capacitors.

10. The liquid crystal display device of claim 1, wherein the first, second, third, and fourth pixels include one of yellow, cyan, magenta, and white pixels and all of red, green, and blue pixels.

11. The liquid crystal display device of claim 1, wherein the first, second, third, and fourth colors include red, green, and blue or at least red, green, and blue.

12. The liquid crystal display device of claim 1, wherein in an arbitrary row of the plurality of pixels, an arrangement of the bright and dark subpixels in the column direction in one of two adjacent ones of the plurality of color display pixels is opposite to an arrangement of the bright and dark subpixels in another one of the two arbitrary adjacent ones of the plurality of color display pixels.

13. The liquid crystal display device of claim 1, wherein in an arbitrary row of the plurality of pixels, an arrangement of the bright and dark subpixels in the column direction in one of two adjacent ones of the plurality of color display pixels is opposite to an arrangement of the bright and dark subpixels in another one of the two arbitrary adjacent ones of the plurality of color display pixels.

* * * * *